(12) United States Patent
Tye et al.

(10) Patent No.: US 10,882,589 B2
(45) Date of Patent: Jan. 5, 2021

(54) RETROFIT VARIABLE RELUCTANCE MEASUREMENT TECHNOLOGY TENDON TENSION MONITORING SYSTEM

(71) Applicant: OIL STATES INDUSTRIES, INC., Arlington, TX (US)

(72) Inventors: Daniel Joseph Tye, Dallas, TX (US); John Ray Baileys, Arlington, TX (US); Joseph Michael O'Neil, Irving, TX (US); Michael Eugene Hogan, Arlington, TX (US)

(73) Assignee: OIL STATES INDUSTRIES, INC., Arlington, TX (US)

( * ) Notice: Subject to any disclaimer, the term of this patent is extended or adjusted under 35 U.S.C. 154(b) by 69 days.

(21) Appl. No.: 16/007,897

(22) Filed: Jun. 13, 2018

(65) Prior Publication Data

US 2019/0168845 A1   Jun. 6, 2019

Related U.S. Application Data

(60) Provisional application No. 62/594,282, filed on Dec. 4, 2017.

(51) Int. Cl.
*B63B 21/50* (2006.01)
*G01L 5/101* (2020.01)
(Continued)

(52) U.S. Cl.
CPC ........ *B63B 21/502* (2013.01); *E21B 43/0107* (2013.01); *G01L 1/127* (2013.01);
(Continued)

(58) Field of Classification Search
CPC ... B63B 21/502; E21B 43/0107; E21B 47/01; G01L 1/127; G01L 5/101; G01N 27/228
(Continued)

(56) References Cited

U.S. PATENT DOCUMENTS

RE31,698 E  *  10/1984  Sansome ............... G01L 1/2231
                                                    73/862.635
4,811,597 A     3/1989   Hebel
(Continued)

FOREIGN PATENT DOCUMENTS

GB     2541722     3/2017
GB     2547493     8/2017
(Continued)

OTHER PUBLICATIONS

Patent Cooperation Treaty—International Search Report and Written Opinion—PCT/US18/37407, dated Nov. 5, 2018.
(Continued)

*Primary Examiner* — Octavia Hollington
(74) *Attorney, Agent, or Firm* — Morgan, Lewis & Bockius LLP

(57) ABSTRACT

The invention relates to floating platform mooring and involves an improved platform mounted tendon tension monitoring system with porch mounted variable reluctance measurement technology sensors configured. The variable reluctance measurement technology sensors of this system are optimized for porch mounting. The porch mounted tendon tension monitoring system can also be configured such that the porch-mounted optimized variable reluctance measurement technology sensors are replaceable. Sensors may be replaced to extend the desired useful lifetime of a tendon tension monitoring system or in the event that a sensor happens to malfunction. A plurality of variable reluctance measurement technology sensors can be configured in sensor packs at the corners or at other locations where tendon tension monitoring can be useful for a floating platform.

21 Claims, 22 Drawing Sheets

(51) Int. Cl.
  *G01L 1/12* (2006.01)
  *E21B 43/01* (2006.01)
  *G01N 27/22* (2006.01)
  *E21B 47/01* (2012.01)

(52) U.S. Cl.
  CPC ............ *G01L 5/101* (2013.01); *G01N 27/228* (2013.01); *E21B 47/01* (2013.01)

(58) Field of Classification Search
  USPC .......................................................... 73/782
  See application file for complete search history.

(56) References Cited

U.S. PATENT DOCUMENTS

| | | | |
|---|---|---|---|
| 4,825,701 | A | 5/1989 | Holtslander |
| 5,359,902 | A | 11/1994 | Barger et al. |
| 6,190,091 | B1 | 2/2001 | Byle |
| 6,422,089 | B1 | 7/2002 | Madden et al. |
| 6,591,688 | B2 | 7/2003 | Wright |
| 6,748,809 | B2 | 6/2004 | Madden |
| 6,752,039 | B2 | 6/2004 | Kreuzer et al. |
| 6,880,408 | B1 | 4/2005 | Madden et al. |
| 6,932,542 | B2 | 8/2005 | Chianis et al. |
| 7,063,485 | B2 | 6/2006 | Jordan et al. |
| 7,493,827 | B2 | 2/2009 | Madden et al. |
| 9,512,714 | B2 * | 12/2016 | Sobolewski ............ E21B 47/01 |
| 9,638,654 | B2 | 5/2017 | Baileys |
| 10,308,324 | B2 * | 6/2019 | Baileys ................. E21B 47/122 |
| 2002/0160667 | A1 | 10/2002 | Madden et al. |
| 2004/0035215 | A1 | 2/2004 | Hanna et al. |
| 2004/0154390 | A1 | 8/2004 | Baustad |
| 2005/0028606 | A1 | 2/2005 | Madden et al. |
| 2005/0028607 | A1 | 2/2005 | Hanna et al. |
| 2006/0021445 | A1 | 2/2006 | Hanna et al. |
| 2006/0177276 | A1 | 8/2006 | Stassen et al. |
| 2010/0162491 | A1 | 7/2010 | Souter et al. |
| 2012/0132467 | A1 | 5/2012 | Zeineddine |
| 2013/0269946 | A1 | 10/2013 | Dziekonski |
| 2015/0145533 | A1 | 5/2015 | Baileys |
| 2015/0369037 | A1 | 12/2015 | Jones |

FOREIGN PATENT DOCUMENTS

| | | |
|---|---|---|
| KR | 2016112502 | 9/2016 |
| KR | 2016113757 | 9/2016 |
| WO | 2003091680 | 11/2003 |
| WO | 2003099424 | 12/2003 |
| WO | 2017141056 | 8/2017 |

OTHER PUBLICATIONS

Patent Cooperation Treaty; International Search Report and Written Opinion of the International Searching Authority; PCT/US19/36116; dated Sep. 4, 2019.

Communication of European Search Report and Opinion, Application No. EP 17881274, dated Jun. 19, 2020.

Patent Cooperation Treaty, PCT/US2017/066858, (Filed Dec. 12, 2017) International Search Report and Written Opinion, dated Feb. 12, 2018.

* cited by examiner

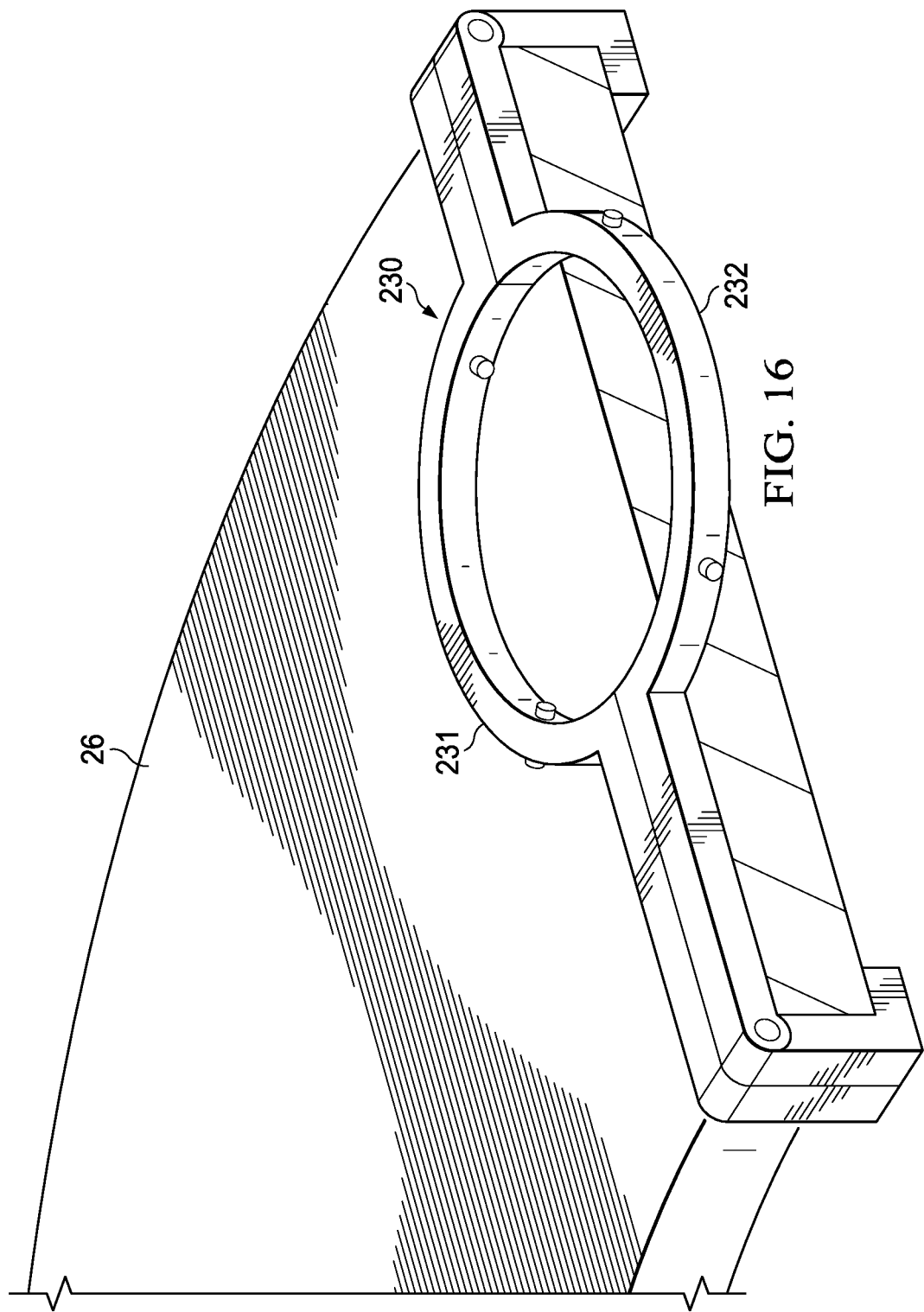

RETROFIT VARIABLE RELUCTANCE MEASUREMENT TECHNOLOGY TENDON TENSION MONITORING SYSTEM

FIELD OF THE INVENTION

The invention relates to floating platform porch mounted tendon tension monitoring systems.

BACKGROUND

Tension Leg Platforms or "TLPs" have been used for some time in the offshore production of oil and gas. Often a tension leg platform will be moored by groupings of tendons at each corner of a platform. The lifetime of a given platform may be anywhere from 20-50+ years and thus it has become necessary to put systems in place to monitor the tendon tensions of platforms to ensure a platform can continue reliable and safe operations. Over time, a few different configurations of tendon tension monitoring have become the solution of choice for offshore TLPs. Each configuration involves the use of load measurement units and sensors. One configuration uses in-line sensors while the other configuration uses porch mounted sensors. The in-line system type is often installed as part of the tendon string, whereas the porch mounted system type is not part of the tendon but instead pre-installed as part of the tendon top connection apparatus. An in-line tendon tension monitoring system ("TTMS") will often be configured to employ load measurement units consisting of relatively long sections of tendon pipe or forged tubing, and are connected in-line near the top of the tendon body. In a known configuration of an in-line system variable reluctance measurement technology ("VRMT") sensors can be configured and mounted on the facing flanges that are attached to the outside of the load measurement section of the in-line system.

In contrast to an in-line system, a porch-mounted tendon tension monitoring system ("TTMS") is often configured with three or more compression type load cells that are arranged about the opening in the tendon top connector assembly ("TCA") and between bearing plates positioned either above or below a top connector flex element.

Over time it has become apparent that the variable reluctance measurement technology sensors configured on in-line tendon tension monitoring systems are significantly more reliable than the load cell sensors that are often configured in porch mounted tendon tension monitoring systems. The initial cost of an in-line system far surpasses the initial cost of a porch mounted system. However, conventional porch-mounted systems do not provide service life beyond five to ten years, and there are significant additional costs to servicing conventional porch-mounted systems as tension must be removed from the tendon being serviced. It would thus be desirable to configure the more reliable variable reluctance measurement technology sensor in a porch mounted system. One problem with such a setup is that conventional variable reluctance measurement technology sensors have insufficient displacement sensitivity to be used as part of a porch mounted system. There are also space considerations because of the limited space available between the tendon porch and the tendon top connector assembly. Conventional variable reluctance measurement technology sensors also do not fit the space profile a typical porch mounted system would require.

Regarding variable reluctance measurement technology sensors, several prior art documents disclosed in-line VRMT sensor designs, these include U.S. Pat. Nos. 7,493,827, 6,752,039, and 6,422,089; and U.S. patent application Ser. No. 10/848,525. Mechanical amplifier systems and methods were further disclosed in several prior art documents, including U.S. Pat. No. 6,880,408, U.S. Pat. Appl. Ser. No. 60/375,789, and PCT App. No. PCT/US03/12869. Load monitoring systems and methods have also been disclosed in prior art documents, including U.S. Pat. No. 6,748,809, U.S. patent application Ser. Nos. 10/848,600 and 11/152,303, and PCT App. No. PCT/US03/15974.

Regarding VRMT sensor designs, prior art U.S. Pat. No. 7,493,827, which is incorporated herein by reference in its entirety, describes a VRMT sensor as a sensor that uses opposing magnetic cores contained in a support tube. Each of the magnetic cores is attached to opposing ends of the support tube. Thus, as the support tube expands along the tube axis, the ends of the support tube, which are perpendicular to the tube axis, separate. A magnetic circuit is formed having an inductance defined by the size of the gap between the magnetic cores. Accordingly, when the magnetic cores attached to the tube ends separate, the size of the gap between the magnetic cores is increased. Thus, when the inductance is altered, the amount of expansion that has occurred can be determined. Knowing the elastic characteristics of the support tube material, the amount of force applied to the support tube can be calculated. Similarly, contraction of the support tube results in a change in inductance that is indicative of the amount of stress reduction. Alternatively, the support tube can have very little stiffness relative to the structure that it is mounted on so that no load passes through the support tube and it merely displaces the same amount as the structure displaces in the region between the attachment points. The combination is tested under known loads to provide the calibration.

U.S. Pat. No. 7,493,827 goes on to state that one of the magnetic cores is generally preferred to be configured in a C-shape, and attached to an end plate by way of a bracket. The end plate may be one of the tube ends, or another plate that is in turn attached to the support tube. The C-shape is preferred for one of the magnetic cores so that the windings can be placed at the ends of the C-shaped cores. The other magnetic core is preferably I-shaped, and is attached to a second end plate by way of a second bracket. The second end plate, like the first end plate, may be the other tube end, or another plate that is in turn attached to the support tube. Thus, a cavity within the support tube containing the sensor is formed. Preferably, the cavity containing the sensor is sealed in a manner to prevent water or other damaging agents from entering the cavity and damaging the sensor or its wiring. The cavity can also be filled with a low durometer elastomeric potting material, silicon oil, or any other suitable material for protection of the components from environmental agents such as water. The choice of the elastomeric potting material can be selected according to the anticipated environmental exposure of the sensor. For example, in certain applications, a low out-gassing material may be appropriate if the sensor is used at high altitude or space while a low compression material may be better if the sensor is used below sea level, such as underwater or underground.

Continuing its description of VRMT sensors, U.S. Pat. No. 7,493,827, further describes that an excitation coil is wound around the poles on one of the magnetic cores, and provides electrical connection for an inductance whose value is variable as a function of the widths of the gaps, and also the axial distortion of the support tube. In the preferred embodiment, there are two excitation coils, each surrounding a separate end of the C-shaped core. This arrangement minimizes non-linearity of response due to fringing effects.

The wires from the two coils are twisted and attached to cabling that connects them to external circuitry. Thus, when excited by an external AC voltage, the C-core, the I-core and the gap between the C and I cores form an element of a magnetic circuit. The reluctance of this element is dominated by the gap because the C and I cores are fabricated from high permeability magnetic materials having very little reluctance. The sensor inductance is coupled with a fixed, predetermined capacitance in a resonant inductance-capacitance (LC) circuit. The resonant frequency of the LC circuit is a function of the gap between the C-shaped and I-shaped cores. Accordingly, changes in the gap dimension results in a change in oscillation frequency. Since the only changeable component in the sensor is the number of excitation coils, the sensor is immune to drift.

Finally, as describing VRMT sensor use in an in-line sensor configuration, U.S. Pat. No. 7,493,827 states that, to measure the load on a static device, for example, a chain that moors a marine platform, the support tube is fixedly attached to the surface of a sensor link, and the sensor link placed as a link in the chain. The support tube can be attached to the surface of the sensor link using bolts, by welding, or any other suitable attaching means. In order for the sensor to measure the load on the sensor link, it is preferred that the sensor tube material and the sensor link material are compatible, more preferably the same material or material having the same or similar coefficient of thermal expansion. In the preferred embodiment, the support tube and the sensor link are made of steel. When used in marine applications, it is preferred that a protective coating is applied to the support tube and the sensor link.

Mechanical amplifiers have also seen use in conjunction with VRMT sensors, with one such amplifier configuration being described in prior art U.S. Pat. No. 6,880,408, which is incorporated herein by reference in its entirety. Such an amplifier is described to generally amplify a given load by multiplying the displacement by the stiffness of the load carrying member in order to obtain a reliable displacement measurement. The precision of the measurement as a percentage of full scale load is determined by the ratio of the smallest displacement that the device can resolve to the displacement under full load. In this patent, an embodiment of mechanical amplifiers is described as comprising first and second amplifier mounting pads, at least one of the first and second amplifier mounting pads connecting to a load carrying member, the first and second sensor mounting pads connected to the first and second amplifier mounting pads via flexible connecting members; and a sensor connected to the first and second sensor mounting pads.

Regarding conventional designs of porch-mounted systems, compression load cells have been employed in such systems and as configured they have the sensitivity needed to work in the limited space available between the tendon porch and the tendon top connector assembly. One major drawback with the compression load cells that are often configured in porch-mounted systems is that after only a few years of service they begin providing unreliable measurement signals. This is not advantageous for a floating platform that may have a service life of 20-50 years as it means the compression load cells need to be serviced often over the lifespan of the platform. In addition to this drawback, the compression load cells and their embedded sensors cannot be serviced or replaced without completely removing tension from the associated tendon line. This results in increased service costs and potential downtime for a given platform which incurs additional costs.

One other drawback regarding porch mounted compression load cell tendon tension monitoring systems results from the arrangement of discrete compression load cells about the central axis of a tendon line along the central axis of a tendon top connector assembly. This results in a discontinuous load path from the upper load plate to the lower load plate. This requires the load plates to be stiff enough to resist significant deflection between the load cell contact points, and also wide enough to transmit the tendon force among the discrete compression load cells. Both of these factors result in heavy and expensive plate sections, which incur significant initial costs and again require additional expenditure to service.

A porch mounted tendon tension monitoring system is thus desired that has reduced service requirements over time and simpler serviceability when needed. It would also be desirable to optimize and utilize variable reluctance measurement technology sensors in a porch mounted tendon tension monitoring system.

SUMMARY OF THE INVENTION

The invention involves a porch mounted tendon tension monitoring system for tension leg platforms that utilizes variable reluctance measurement technology sensors instead of conventional bridge "load cell" style sensors. As a result, this tendon tension monitoring system beneficially has fewer anticipated service intervals over its lifetime while also being serviceable without the need to completely remove tension to a given leg of a tension leg platform. The tendon tension monitoring system described herein includes an optimized configuration of variable reluctance measurement technology sensors, wherein the sensors have increased wire turns around each end of their C-cores or alternatively are mounted on mechanical amplifiers or both. An array of optimized variable reluctance measurement technology sensors can be configured as part of a porch mounted system. The sensors can be located between the tendon top connector flanges and can be configured to measure the gap between the flanges. The system can then calculate and report tendon tension based on the changes in this gap. Also disclosed is the conversion of tendon load cell assemblies using variable reluctance measurement technology to extend the service life of existing tendon tension monitoring systems.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 16 is a view of an embodiment of a radial locating device with hinges.

DETAILED DESCRIPTION

Figure 1:
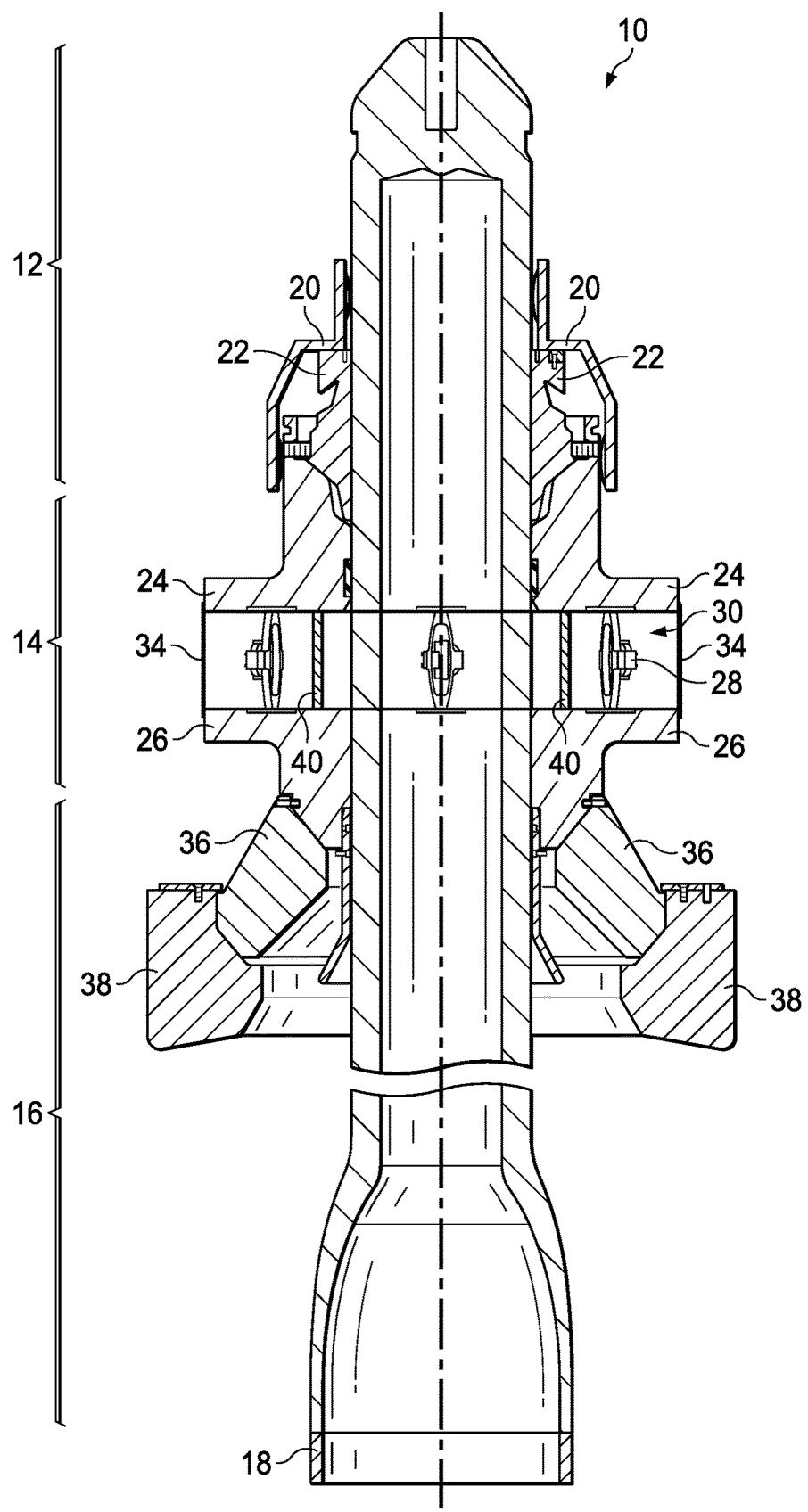
FIG. 1 is a side cross sectional view of an embodiment of a porch-mounted variable reluctance measurement technology tendon tension monitoring system.

Exemplary embodiments are illustrated in referenced figures of the drawings. It is intended that the embodiments and figures disclosed herein are to be considered illustrative rather than restrictive. No limitation on the scope of the technology that follows is to be imputed to the examples shown in the drawings and discussed herein.

A porch mounted tendon tension monitoring system ("TTMS") using optimized variable reluctance measurement technology ("VRMT") sensors instead of conventional "load cell" style sensors is described herein. Such a system is typically installed in conjunction with a vertical mooring system for a floating platform. These systems are often used for platforms in 1000-6000 ft. of water offshore, though they can also be used at other depths outside this range. In general, tendon tension monitoring systems help to confirm that the tension of the moorings is sufficient to assure that the natural frequency of the platform system is sufficiently higher than the wave frequencies and other naturally occurring conditions that may affect platform stability. Differing from prior porch mounted tendon tension monitoring systems where discrete compression "load cells" were configured, in an embodiment, the new design is configured with a single cylindrical compression unit that is axis-symmetric to the line of force with the top connector assembly ("TCA"). The benefits resulting from such a configuration include the following: (1) the transmission force between the upper and lower load plates of the TCA is continuous about the circumference of the contact surface between the plates and the compression unit, and the compression unit and sensors are more compact in terms of radial spacing than the typical porch mounted tendon tension monitoring system compression load cells; this results in the size, weight, and cost of the TCA load plate being significantly reduced and also makes the plate easier to handle onsite; (2) the sensors are decoupled from the compression unit and can be replaced without removing tendon tension; this results in much simpler serviceability of the TTMS; and (3) The sensors are based on variable reluctance measurement technology sensors, thereby providing both improved accuracy and a significantly longer anticipated service life when compared to conventional "load cell" style tendon tension monitoring system sensors.

A re-design of prior variable reluctance measurement technology sensors to allow them to replace the conventional "load cell" style sensors of prior systems was also necessary. In an embodiment, a porch mount optimized VRMT sensor can be configured with increased wire turns at each end of the C-core. In an embodiment, a porch mount optimized VRMT sensor can be configured with mechanical amplifiers. In another embodiment, a porch mount optimized VRMT sensor can be configured with both increased wire turns at each end of the C-core and with mechanical amplifiers.

In an embodiment, a porch mounted tendon tension monitoring system can consist of an array of porch-mount optimized VRMT sensors. Such an array can be configured to be mounted between the tendon top connector flanges in the space that would have been occupied by compression "load cell" style sensors in prior designs. The porch-mount optimized VRMT sensors operate by measuring the gap between the flanges. The system can then use this measurement to calculate and report tendon tension based on the changes in the gap. The gap will reduce as load is increased, opposite of how a prior design in-line system would be configured.

By contrast, in a conventional "load cell" style sensor system, the tendon load is transferred between the flanges through the load cells themselves. In an embodiment of a porch-mounted variable reluctance measurement technology tendon tension monitoring system ("PM-VRMT-TTMS"), the load is carried through a single cylindrical compression unit, mounted between two flanges. For either VRMT sensor mounting location described, the VRMT sensors are placed such that they are outside of the load path. This increases the reliability of the system and enables maintenance of the VRMT sensors while the tendon tension is maintained and the system is still in the operational state.

Figure 2:
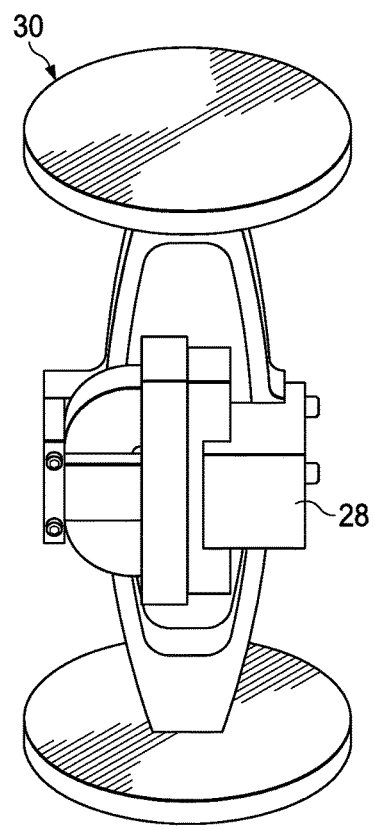
FIG. 2 is a perspective view of a porch-mount optimized variable reluctance measurement technology sensor configured in a mechanical strain amplifier.
Figure 3:
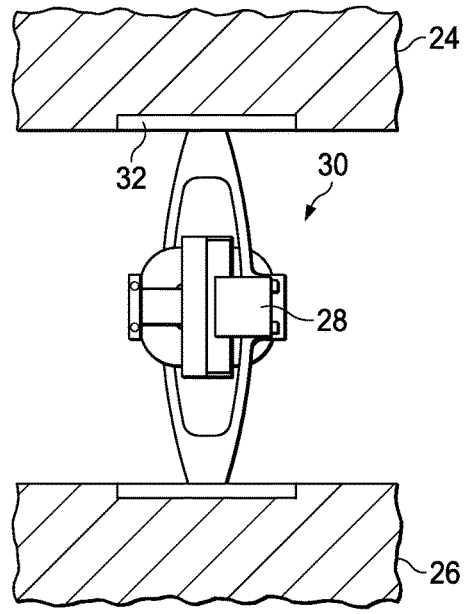
FIG. 3 is an enlarged side cross sectional view of one side of a porch-mounted variable reluctance measurement technology sensor of the variable reluctance measurement technology tendon tension monitoring system as shown in FIG. 1.
Figure 4:
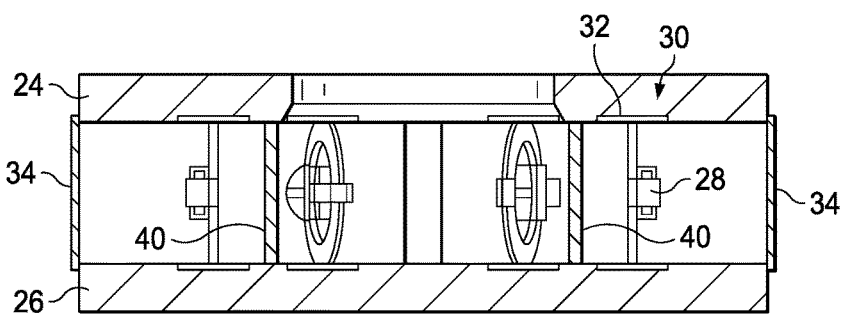
FIG. 4 is an enlarged side cross sectional view of one side of the tendon tension monitoring section of the variable reluctance measurement technology tendon tension monitoring system as shown in FIG. 1.
Figure 6:
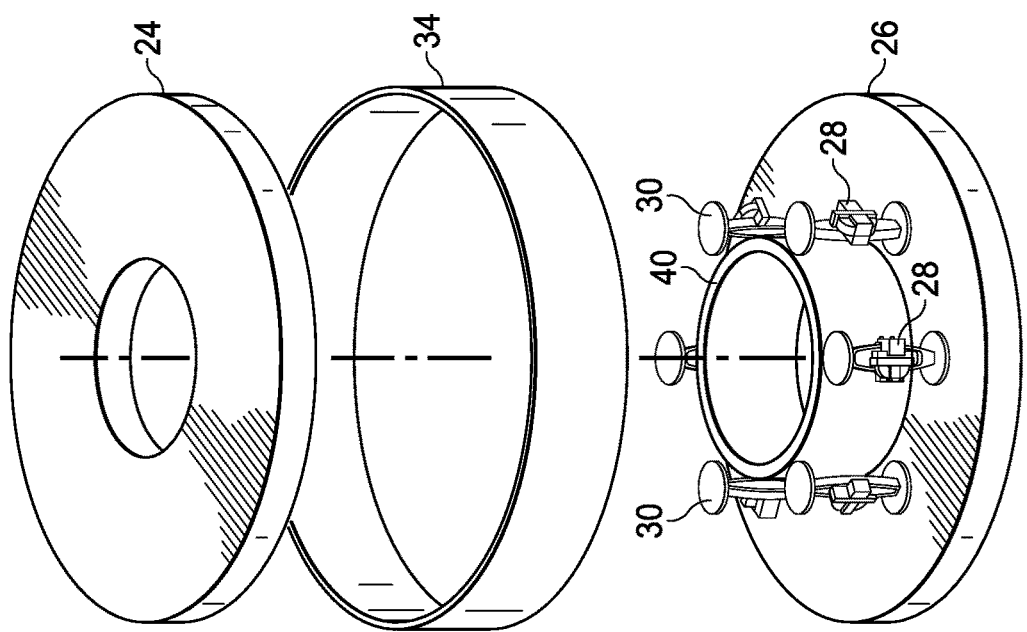
FIG. 6 is a side perspective exploded view of the tendon tension monitoring section of the variable reluctance measurement technology tendon tension monitoring system shown in FIG. 1.
Figure 5:
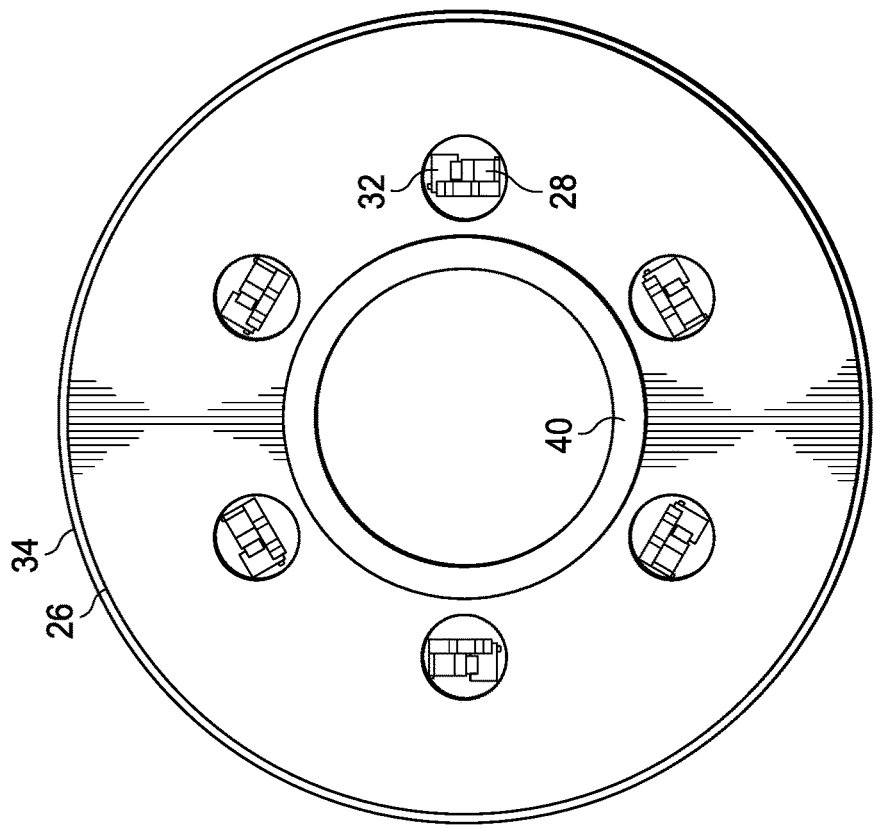
FIG. 5 is an is an enlarged top view of the tendon tension monitoring section of the variable reluctance measurement technology tendon tension monitoring system as shown in FIG. 1 with the upper load plate removed.

Referring to FIGS. 1-6, an embodiment of a porch mount variable reluctance measurement technology tendon tension monitoring system ("PM-VRMT-TTMS") 10 is shown. This system and/or assembly includes several benefits over prior designs as have been described in the accompanying paragraphs. Referring to FIG. 1, the PM-VRMT-TTMS 10 includes each of the following sections: a top connector assembly 12, a tendon tension monitoring section 14, and a lower connector assembly 16. The top connector assembly 12 can include a slip/bowl assembly 20, clamps 22, and may also include other components. The top connector assembly helps secure the PM-VRMT-TTMS 10 to the tendon tension pipe 18, which houses the tendon. In an embodiment, the tendon tension monitoring section 14 can include an upper load plate 24, a lower load plate 26, a rubber boot 34, a plurality of porch-mount optimized VRMT sensors 28 each mounted in a mechanical strain amplifier 30, and a single cylindrical compression cell 40. In an alternative embodiment, multiple cylindrical compression cells can be configured about a central compression cell, or if there is no central compression cell, an inner elastomeric boot can be installed to resist ingress of sea water from the inner bore of the load plates. In the embodiment shown in FIGS. 1-6, six VRMT sensors 28 are shown, each mounted in a mechanical strain amplifier 30, between the upper load plate 24 and the lower load plate 26. In an embodiment more or fewer sensors may be configured, and the spacing/location of each sensor can also differ from what is shown. FIG. 2 shows one of the porch-mount optimized VRMT sensors 28 mounted in a mechanical amplifier strain gauge 30. FIG. 3 illustrates an enlarged side view of one of the sensors 28 mounted in a mechanical amplifier strain gauge 30. In this view, the mechanical amplifier strain gauge mounting slots 32 are more prominently shown. These slots 32 can be configured in an embodiment to aid in the serviceability of the PM-VRMT-TTMS 10. FIG. 4 illustrates a side view of the plurality of porch-mount optimized VRMT sensors 28 mounted in strain amplifiers 30, and configured between the upper load plate 24 and lower load plate 26. FIG. 5 similarly illustrates a top view of the configuration of FIG. 4. FIG. 6, then shows an exploded perspective view of this same portion of the tendon tension monitoring section 14 of FIGS. 1, 4, and 5. In this view the upper load plate 24 is shown spaced apart from the lower load plate 26. The porch-mount optimized VRMT sensors 28 are shown on lower load plate 26. Also shown spaced apart from the lower load plate 26 is the outer rubber cylindrical boot 34. This boot is put in place to protect the sensor 28 and may be made from a variety of materials, with rubber being the most typical. The void area that surrounds the VRMT sensors between the rubber boot and upper and lower load plates will also typically be filled with non-conductive fluid such as a silicone based fluid or gel. Other non-aqueous fluids may also be used. The purpose of the non-conductive fluid or gel is to add additional prevention measures against corrosive deterioration by sea water of the load cell materials, sensors, conductive apparatus and fixtures.

In an embodiment of the tendon tension monitoring section 14 of FIGS. 1, 4, and 5, each slot 32 that holds the strain amplifier 30 and VRMT sensors 28, can also be extended towards the outer ends of the load plates such that when servicing a given sensor they can be more easily slide in and out of their functional position. This feature when configured can allow the strain amplifier 30 and VRMT sensors 28 to more easily be serviced and replaced.

Figure 7:
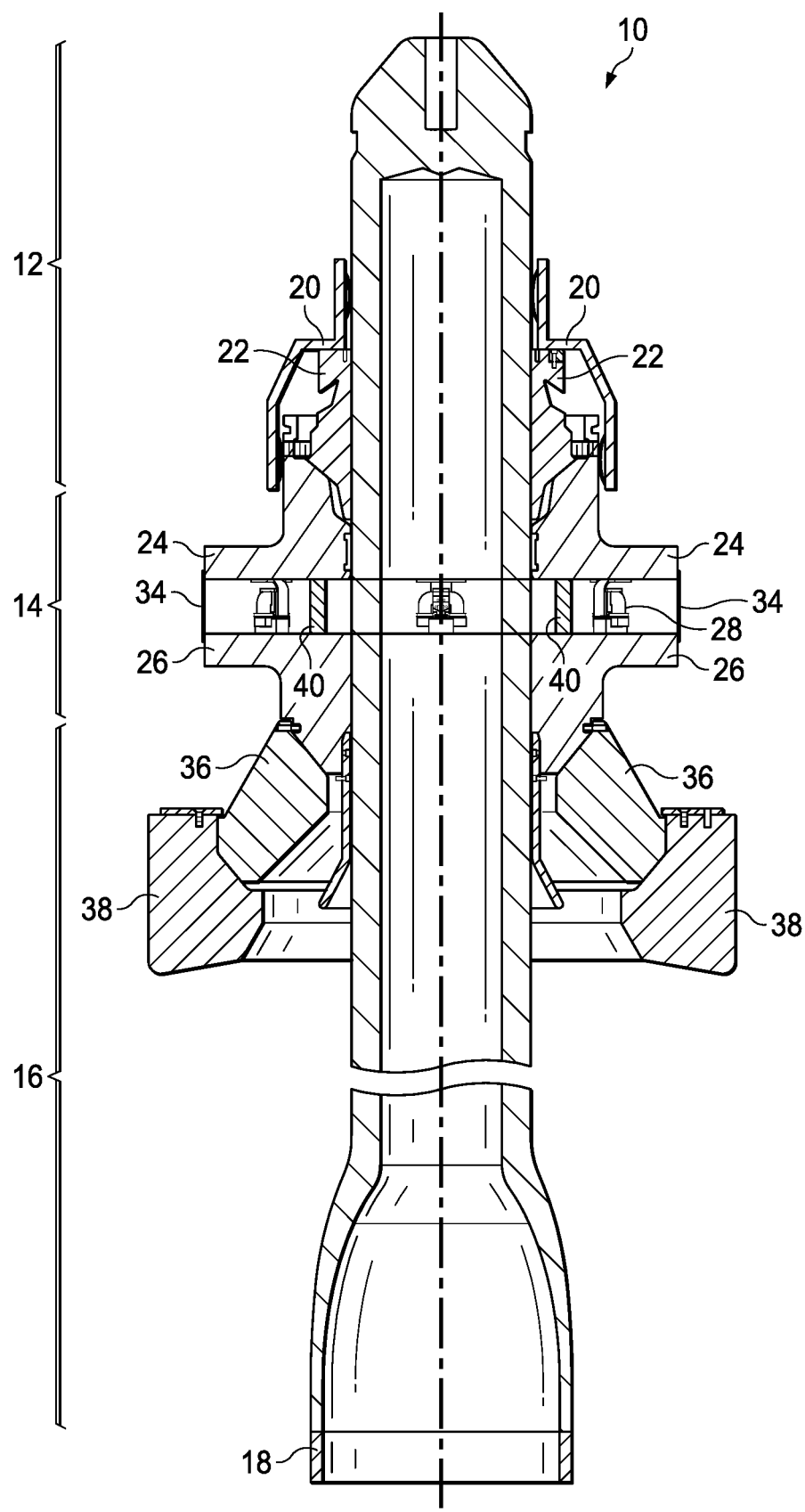
FIG. 7 is a side cross sectional view of an alternate embodiment of a porch-mounted variable reluctance measurement technology tendon tension monitoring system.

Referring to FIG. 7, an alternative embodiment of a porch mount variable reluctance measurement technology tendon tension monitoring system ("PM-VRMT-TTMS") 10 is shown. For the most part, this embodiment resembles and has the same structural features as the embodiment described in relation to FIGS. 1-6, the difference here being the removal of the mechanical strain amplifier from the system. For the embodiment illustrated by FIG. 7, the porch-mount optimized VRMT sensors 28 are mounted to an upper load plate 24 and a lower load plate 26 without the need to configure a mechanical strain amplifier. As described above and below in reference to FIG. 11, in this embodiment, the porch-mount optimized VRMT sensors 28 can be used for this arrangement.

Referring again to FIG. 7, a lower connector assembly 16 is illustrated and positioned beneath the tendon tension monitoring section 14. This assembly can include a flex element 36, a lower connector element 38, and may also include other components. The lower connector assembly 16 assists in securing the tendon tension monitoring section 14 to the tendon pipe 18.

Figure 8:
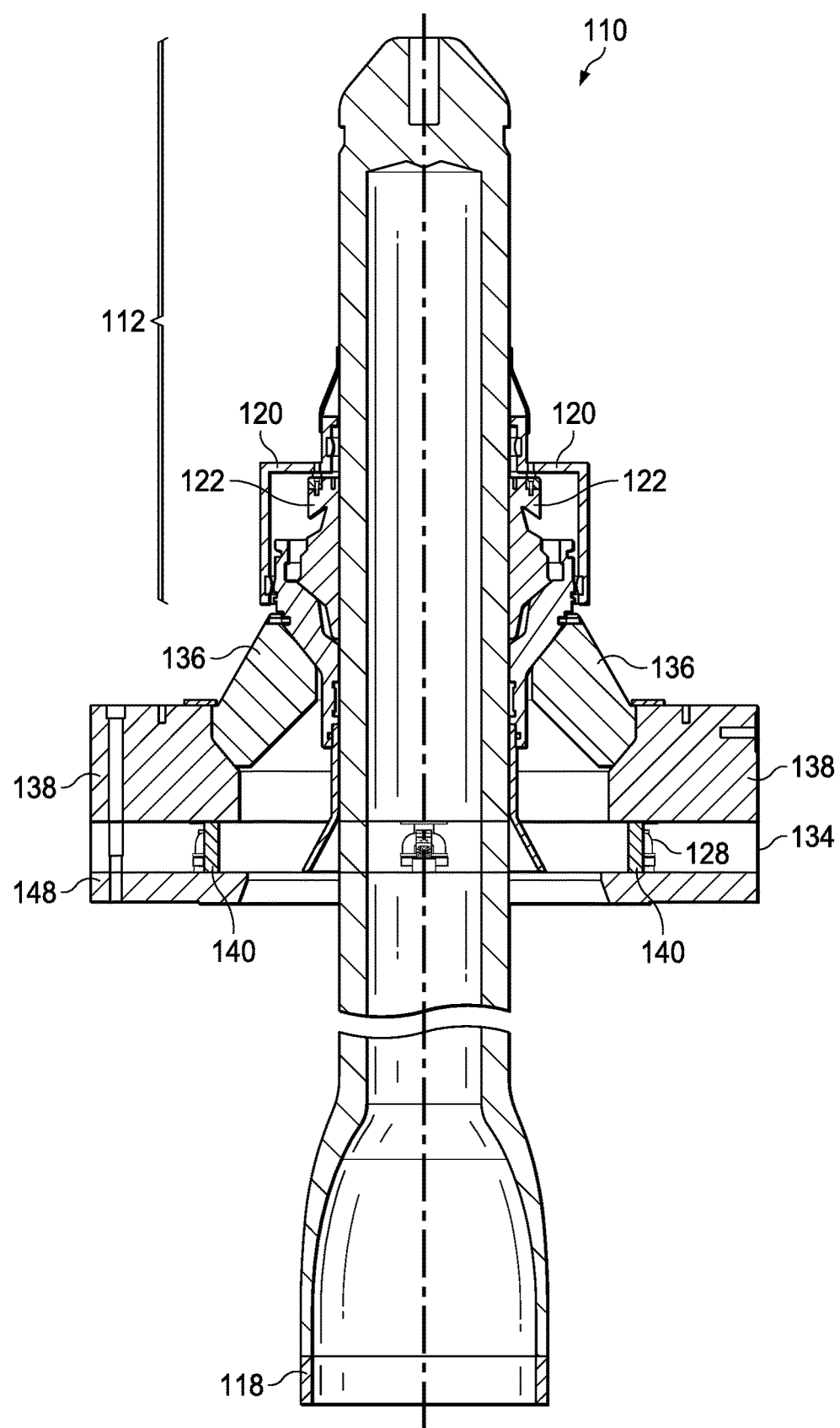
FIG. 8 is a side cross sectional view of an alternate embodiment of a porch-mounted variable reluctance measurement technology tendon tension monitoring system wherein the tendon tension monitoring system is configured below the flex element.
Figure 9:
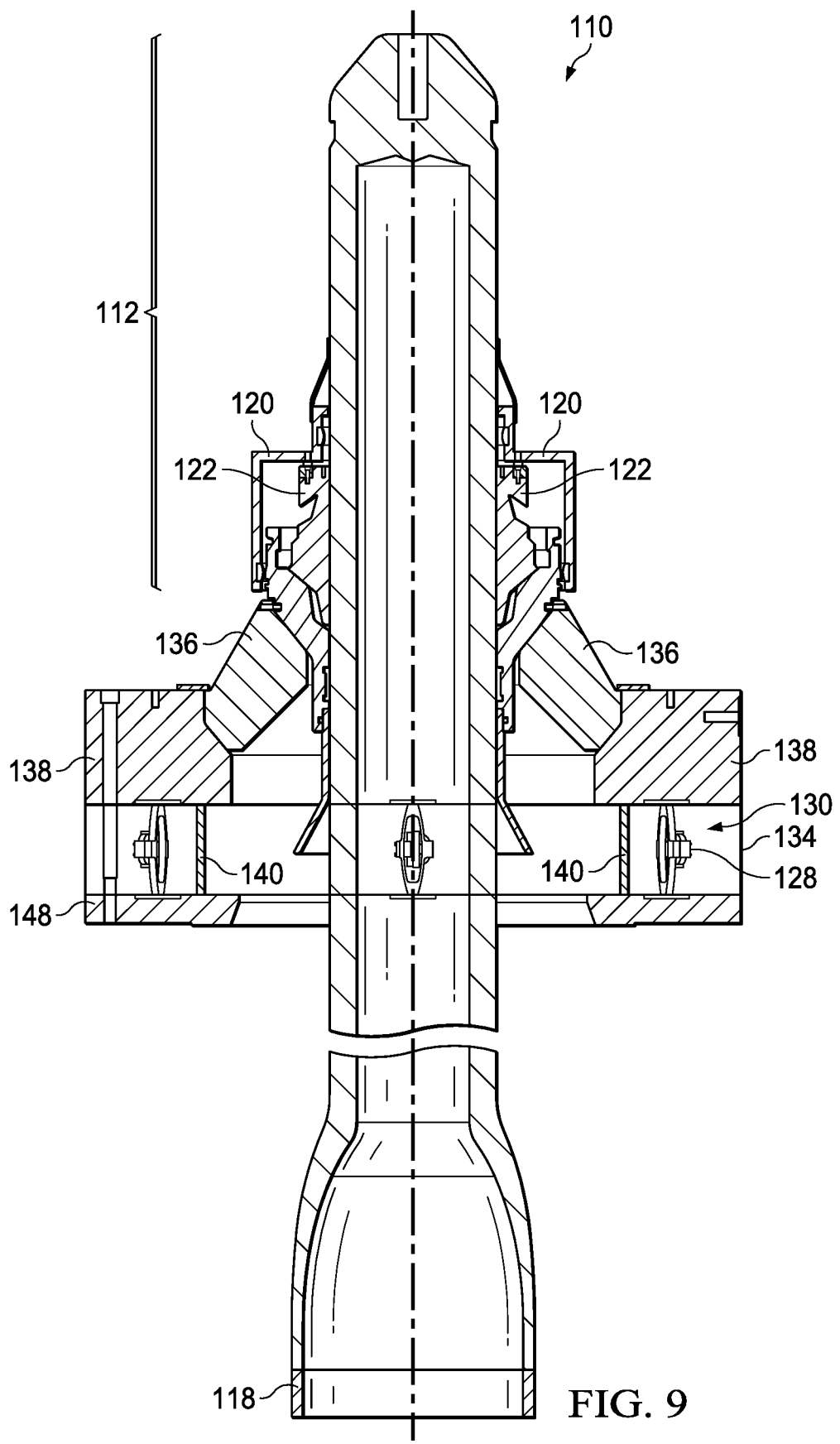
FIG. 9 is a side cross sectional view of an alternate embodiment of a porch-mounted variable reluctance measurement technology tendon tension monitoring system wherein the tendon tension monitoring system is configured below the flex element and the variable reluctance measurement technology sensors are each mounted in a mechanical strain amplifier.

Referring to FIG. 8 and FIG. 9, an alternate embodiment of a porch-mounted variable reluctance measurement technology tendon tension monitoring system 110 is shown wherein the tendon tension monitoring system is configured below the flex element 136. FIG. 8 illustrates an embodiment wherein the VRMT sensors 128 are configured without mechanical strain amplifiers and FIG. 9 illustrates an embodiment wherein VRMT sensors 128 are each configured with a mechanical strain amplifier 130.

Again referring to both FIG. 8 and FIG. 9, in the embodiment shown, the top connector assembly 112 can include a slip/bowl assembly 120, clamps 122, and may also include other components. Six VRMT sensors 128 are shown configured beneath flex element 136 and between a sub-flex-element upper load plate 138 and a sub-flex-element lower load plate 148. In an embodiment more or fewer sensors may be configured, and the spacing/location of each sensor can also differ from what is shown. In an embodiment, slots (not shown) can be configured to aid in the serviceability of the VRMT sensors 128. In an embodiment, an outer rubber cylindrical boot 134 can also be configured. This boot is put in place to protect the sensor 128 and may be made from a variety of materials, with rubber being the most typical. The void area that surrounds the VRMT sensors between the rubber boot and upper and lower load plates will also typically be filled with non-conductive fluid such as a silicon based fluid. Other fluids may also be used. On the interior side of the VRMT sensors 128, a single cylindrical compression cell 140 is shown, though multiple cylindrical compression cells can be configured. Similar to other embodiments, the system 110 connects to a tendon pipe 118 on its lower end.

In the various described embodiments of the variable reluctance measurement technology tendon tension monitoring system, varying placement of the VRMT sensors configured in each embodiment will have an effect on the bending moment of the system and thus different correction factors can be applied to the measurements of the VRMT sensors to address this difference.

Regarding the electronic wiring of the porch mount variable reluctance measurement technology tendon tension monitoring system, a cable must be run to each porch-mount optimized VRMT sensor such that readings can be collected and processed by a computing system and then relayed to operations personnel. In an embodiment, cabling from the sensors will typically be run from the sensors and out of tendon tension monitoring section 14 through rubber grommets (or packing glands) such that the fluidic material in the cavity between the load plates will not escape. The cabling can then extend to a relay point or all the way to the surface. This description of one possible embodiment of the cabling configuration is not meant to be limited and a variety of cabling configurations could be employed. For example, the sensors could also transmit their measurement data wirelessly and they can either be powered by hard power lines or by a battery system. In a typical configuration, the VRMT sensors and signal conditioning equipment are powered by hard wired power lines and relay data over wired connections. Alternatively, the sensors could be connected to a battery-powered signal conditioning/data acquisition unit equipped with data storage modules that can be retrieved by a diver or remote-operated vehicle (ROV). There are multiple different wiring path configurations that can be utilized as would be understood by a person of ordinary skill in the art.

As mentioned above, a computing system can be used to collect, log, process, analyze, broadcast and display readings from the porch-mount optimized VRMT sensors of the system described herein. The system can also be used to determine when sensors may be malfunctioning and providing inaccurate readings. One method for determining if a sensor is providing inaccurate readings is to compare it to the other sensors in the same pack or group of sensors deployed around a tendon. If a sensor is reporting values that differ from the other sensors in its pack or grouping, then this may be an indication that the sensor needs replacement.

Figure 10:
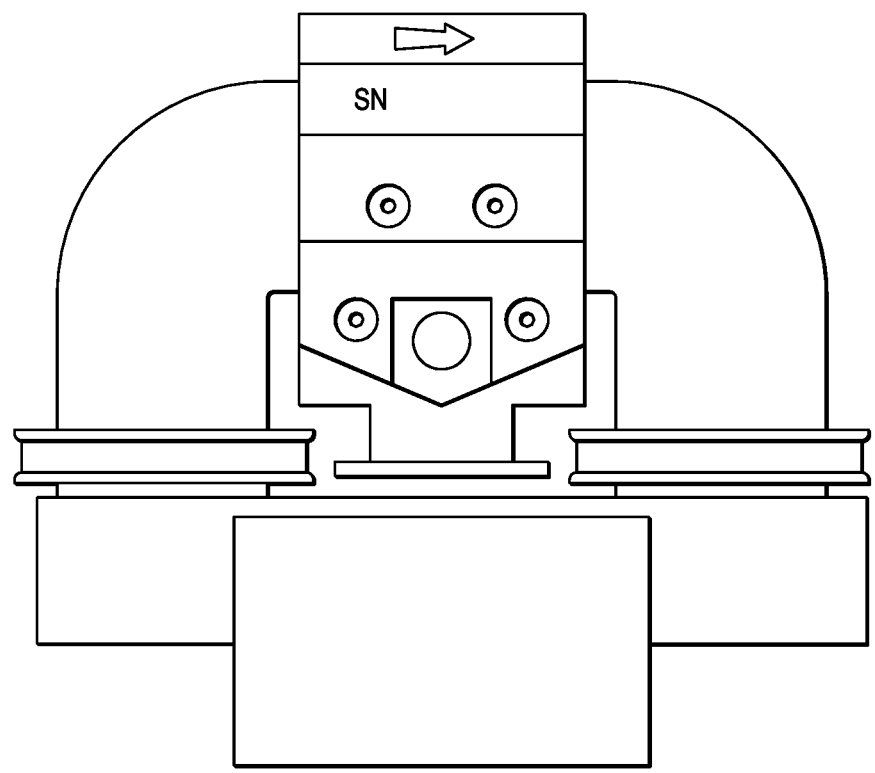
FIG. 10 is a side view of a prior art variable reluctance measurement technology ("VRMT") sensor.

Referring to FIG. 10, a prior art variable reluctance measurement technology ("VRMT") sensor is shown. This VRMT sensor design has the typical coil position as was previously used on in-line style VRMT tendon tension monitoring systems. As mentioned previously, due to the space constraints of the prior design of porch style "load cell" style sensors, this VRMT sensor design would not be useable on the conventional porch configuration.

Figure 11:
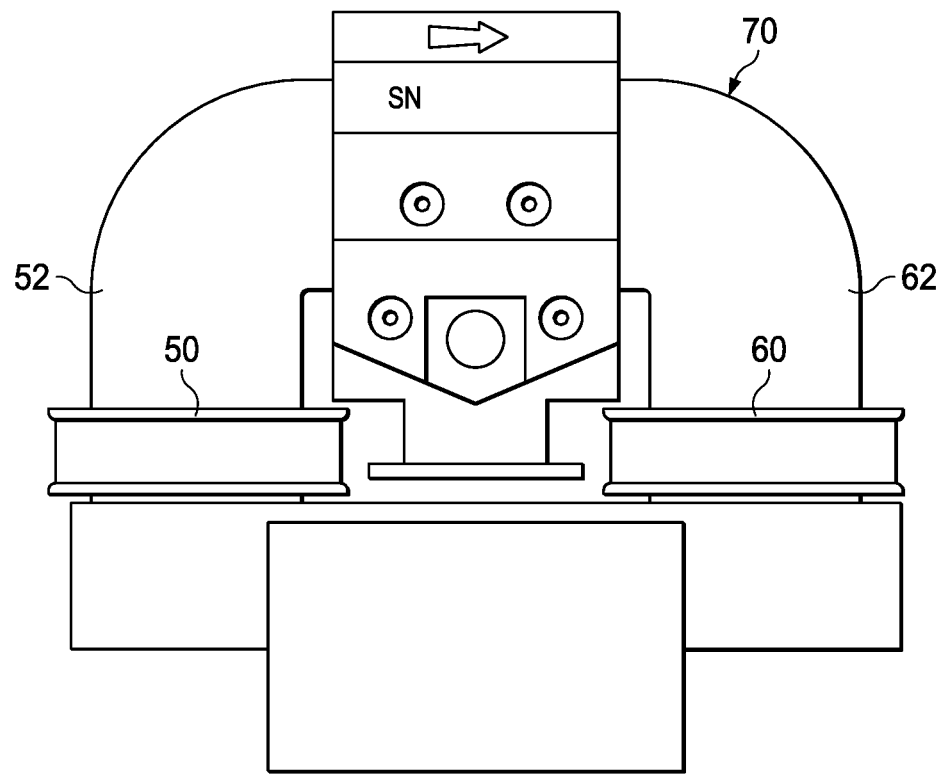
FIG. 11 is a side view of a porch-mount optimized variable reluctance measurement technology ("VRMT") sensor, as could be configured in an embodiment of a porch-mounted variable reluctance measurement technology tendon tension monitoring system.

Referring to FIG. 11, a porch-mount optimized VRMT sensor design is shown. This sensor can be configured in an embodiment of a porch-mounted variable reluctance measurement technology tendon tension monitoring system as described herein. As can be seen in this design, the coil positions have been altered, wherein each of a first coil 50 and a second coil 60 are moved higher up on a first left 52 and a second leg 62 of each end of the C-core 70. The VRMT sensor I-core 80 is also shown. The I-core of the VRMT sensor, together with the C-core, serve as a pair of magnetically permeable core elements. Each are mounted to separate load plates such that varying distance between the load plates causes the gap between the I-core and the C-core to change. An AC voltage energizing the windings around the ends of the C-core provide an electrical inductance which varies as function of the gap, and thus, also, the displacement between the load plates. The rigidity of the cylindrical compression cell or cells can be tuned and/or configured based on the anticipated or designed tensile load point for the tendon of a TLP. Another optimization from the prior art VRMT sensor described above is that the number of coil windings in the first coil 50 and the second coil 60 have both been increased. By increasing the number of windings in each coil the inductance values are increased and greater measurement sensitivity can be obtained. For example, the prior art coils were configured with 82 turns of 24 AWG wire and in a preferred embodiment the porch-mount optimized VRMT sensor coils can be configured with 164 turns of 24 AWG wire. This example is not intended to be limiting. These optimizations allow the porch-mount optimized VRMT sensor to be configured in various embodiments of the porch mount tendon tension monitoring system as described herein and yield a wider range of displacement measurement for a given VRMT sensor.

Figure 12:
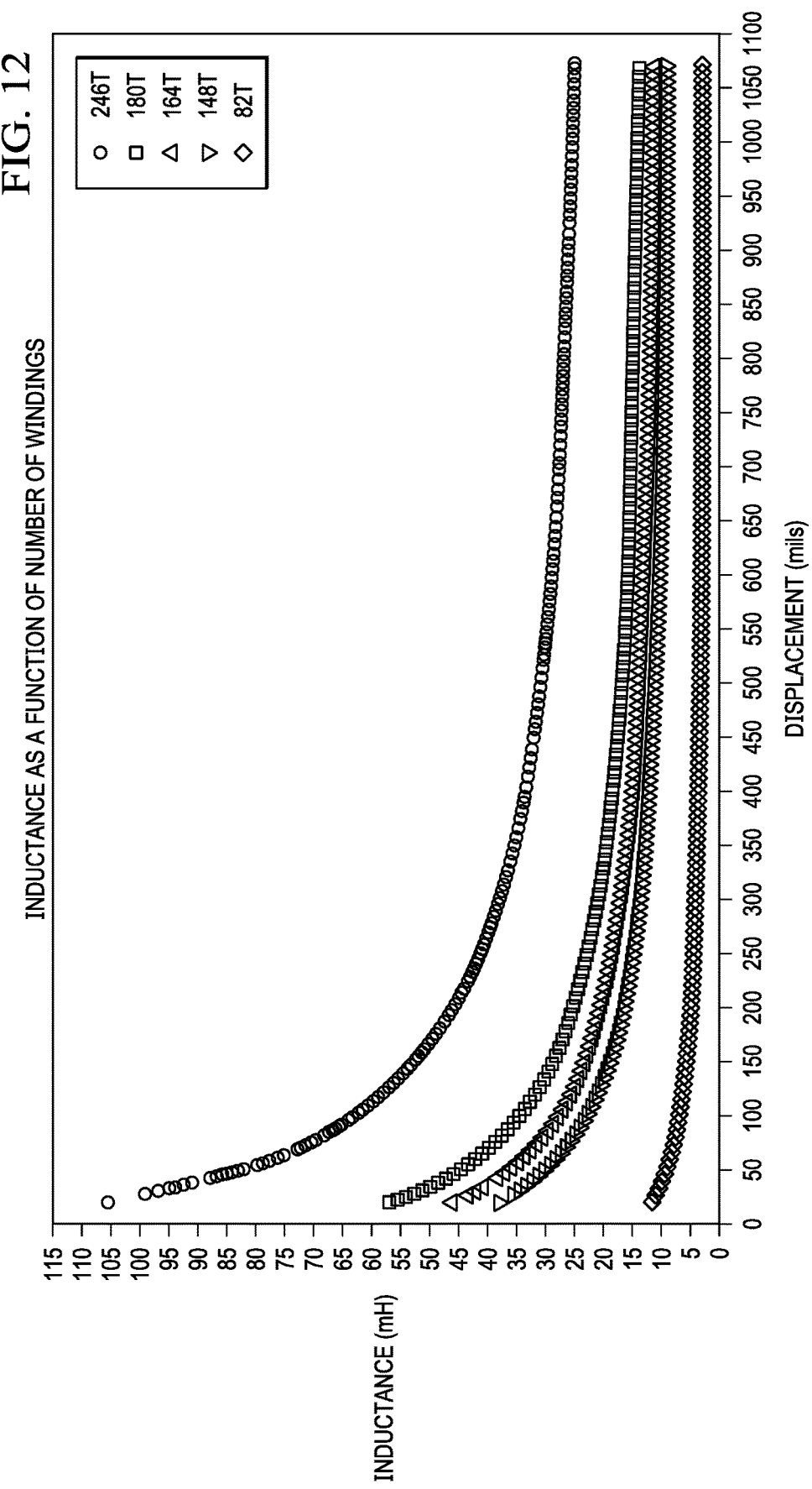
FIG. 12 is a graphical representation showing inductance as a function of number of windings for several embodiments of a porch-mount optimized variable reluctance measurement technology ("VRMT") sensor, as could be configured in an embodiment of a porch-mount variable reluctance measurement technology tendon tension monitoring system.

Referring to FIG. 12, a graphical representation is shown illustrating inductance as a function of number of windings for various potential configurations of porch-mount optimized variable reluctance measurement technology ("VRMT") sensors, as could be configured in an embodiment of a porch-mount variable reluctance measurement technology tendon tension monitoring system. As discussed in the paragraph above, this graphical representation illustrates that by increasing the number of windings in each coil the inductance values may be increased and greater measurement sensitivity can be obtained. As mentioned, by optimizing the winding count and thus the sensitivity of the VRMT sensors, a wider range of displacement measurement for a given VRMT sensor can be obtained.

In an embodiment, an existing porch mounted tendon tension monitoring system using load cell assemblies may be converted to using variable reluctance measurement technology sensors encapsulated in cells that are deployable in the field. Preferably, the field cell containing the sensor is sealed in a manner to prevent water or other damaging agents from entering the field cell and damaging the sensor or its wiring. As described above, the cavity may be filled with a low durometer elastomeric potting material, silicon oil, or another suitable material for protection of the components from environmental agents such as water. The preferred embodiment of the above described field cell would include an internal mechanical assembly consisting of guideposts and springs designed to allow the field cell to return to an equilibrium height following compressive deflection. The aforementioned guideposts may also be designed to allow for a positive stop to limit the compressive displacement of the field cell in order to prevent damage to the sensors.

The elastomer will be formed in a cylindrical arrangement with geometric features, similar to an o-ring, around the top and bottom of the cylinder that will lend themselves to creating a seal against a rigid endplate of the field cell. The elastomer may be a thermoset or thermoplastic material compatible with sea water (e.g., polychloroprene, nitrile, natural rubber, synthetic rubber (such as ethylene propylene diene monomer (EPDM) rubber), or similar material).

Figure 13:
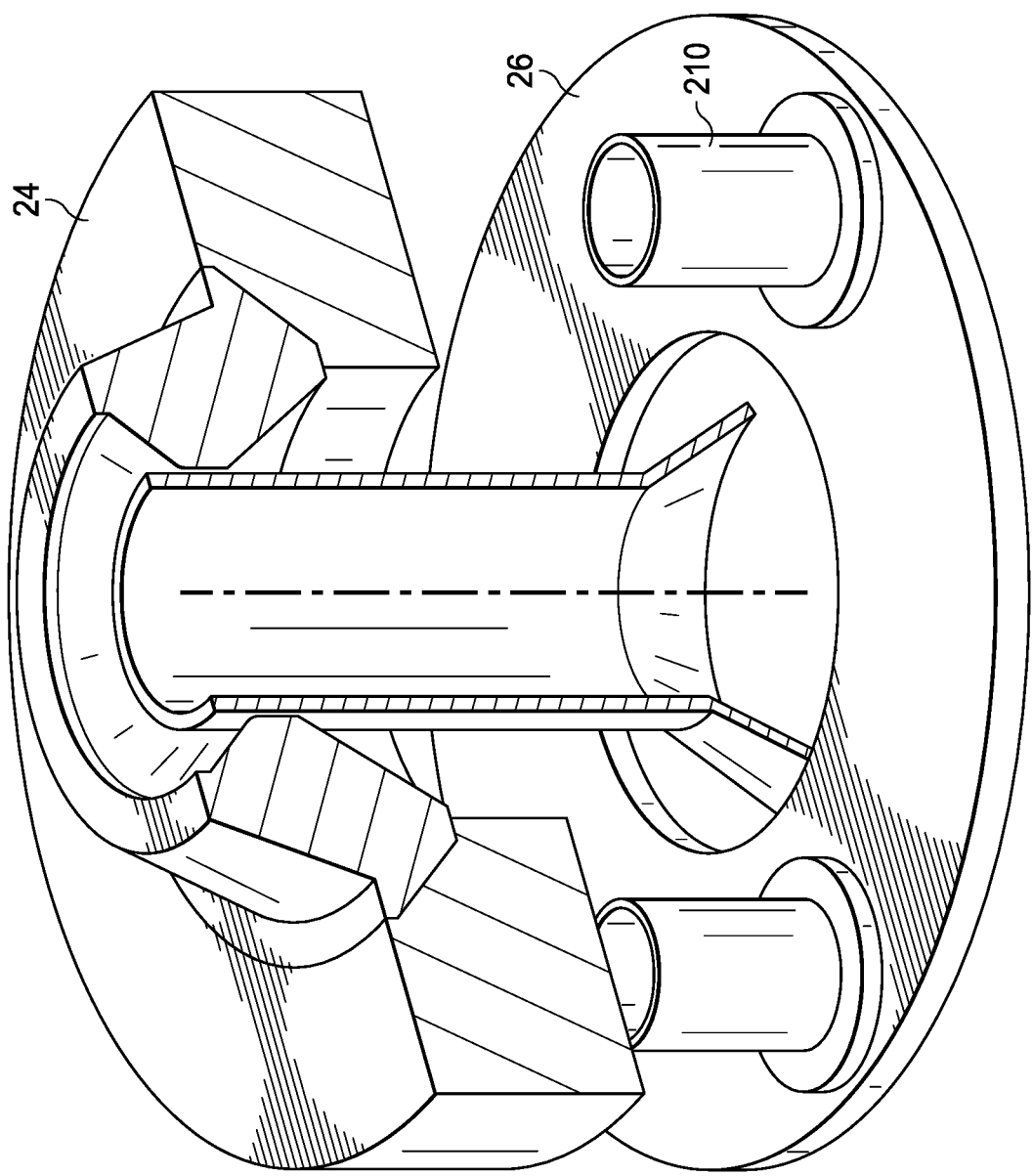
FIG. 13 is a perspective view of a top connector assembly as known in the prior art.

Referring to FIG. 13, an upper load plate 24 and a lower load plate 26 of a tendon top connector assembly 200 are shown. Between the upper load plate 24 and lower load plate 26 are three load cells 210 as they may be configured in an exemplary prior art porch-mounted tendon tension monitoring system installation. Typically, three load cells 210 are deployed around the central axis of the tendon at 120 degrees from each other. As explained above, due to the difference in the service life of conventional load cells in porch-mounted systems and the service life of a floating platform, it is likely that at some point the load cells may begin to provide unreliable measurement signals. The embedded sensors in the load cells cannot be serviced or replaced without removing tension from the tendon line.

Figure 14A:
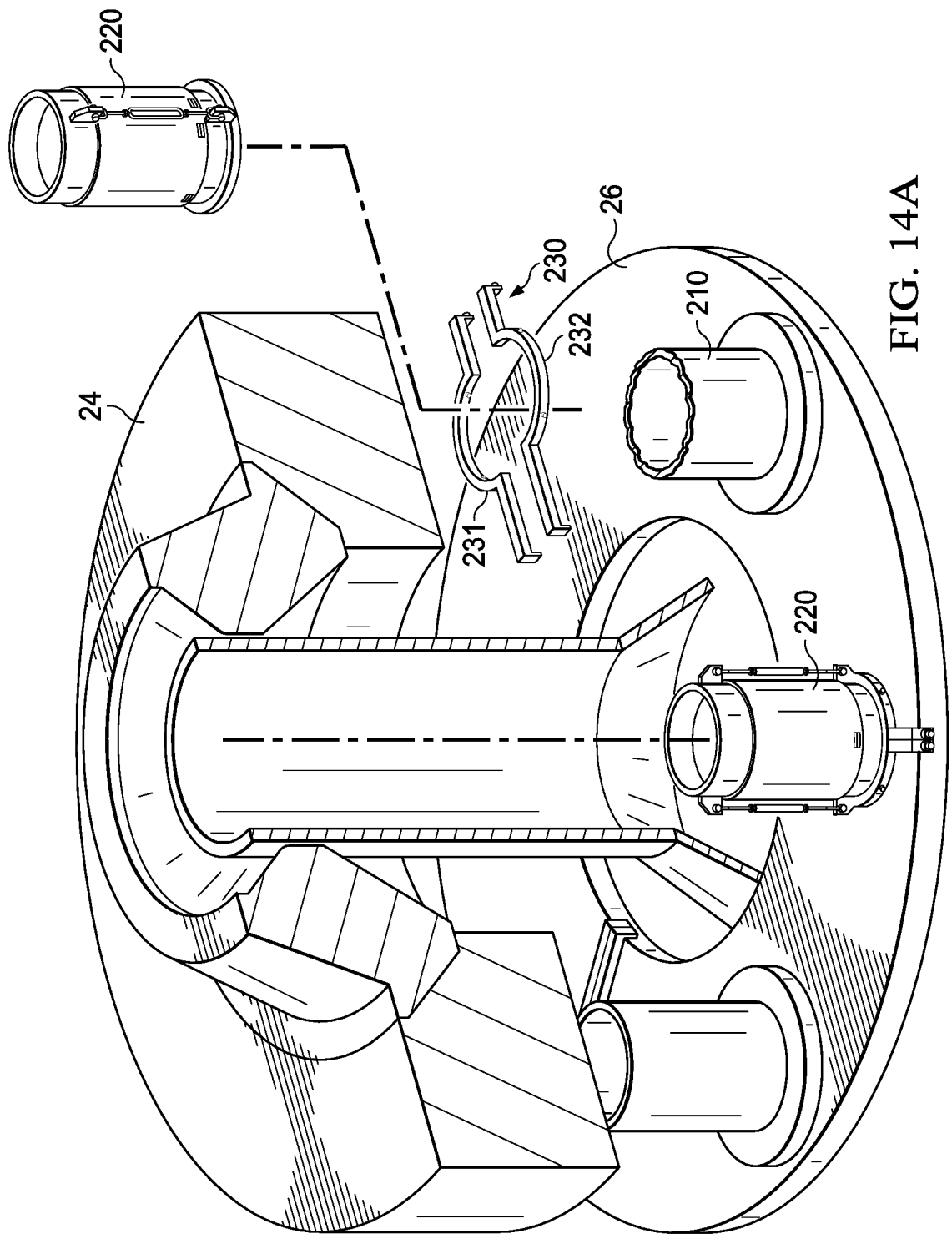
FIG. 14A is a perspective view of a partial installation of variable reluctance measurement technology field cells in a top connector assembly using an embodiment of a radial-locating device.
Figure 14B:
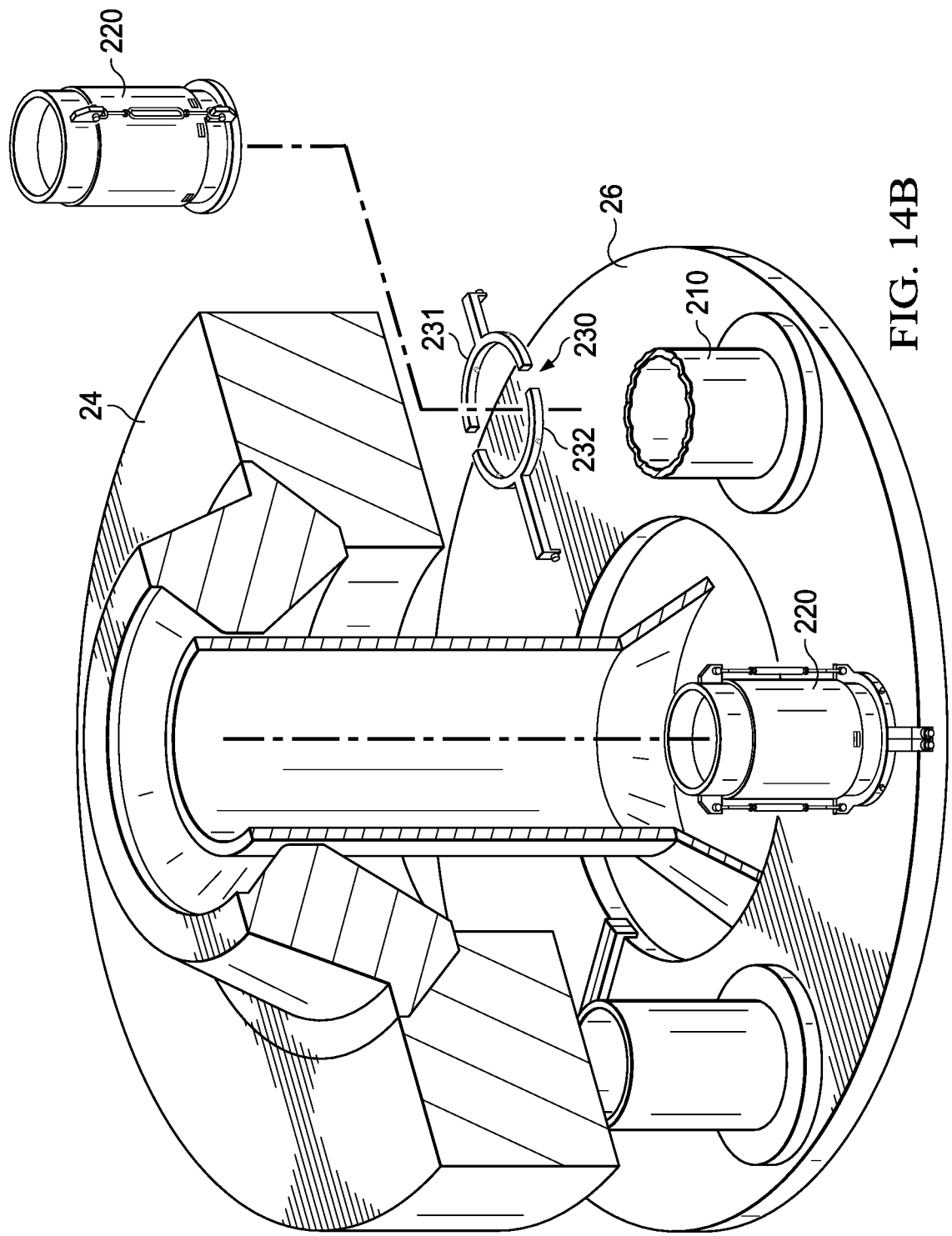
FIG. 14B is a perspective view of a partial installation of variable reluctance measurement technology field cells in a top connector assembly using an embodiment of a radial-locating device.
Figure 14C:
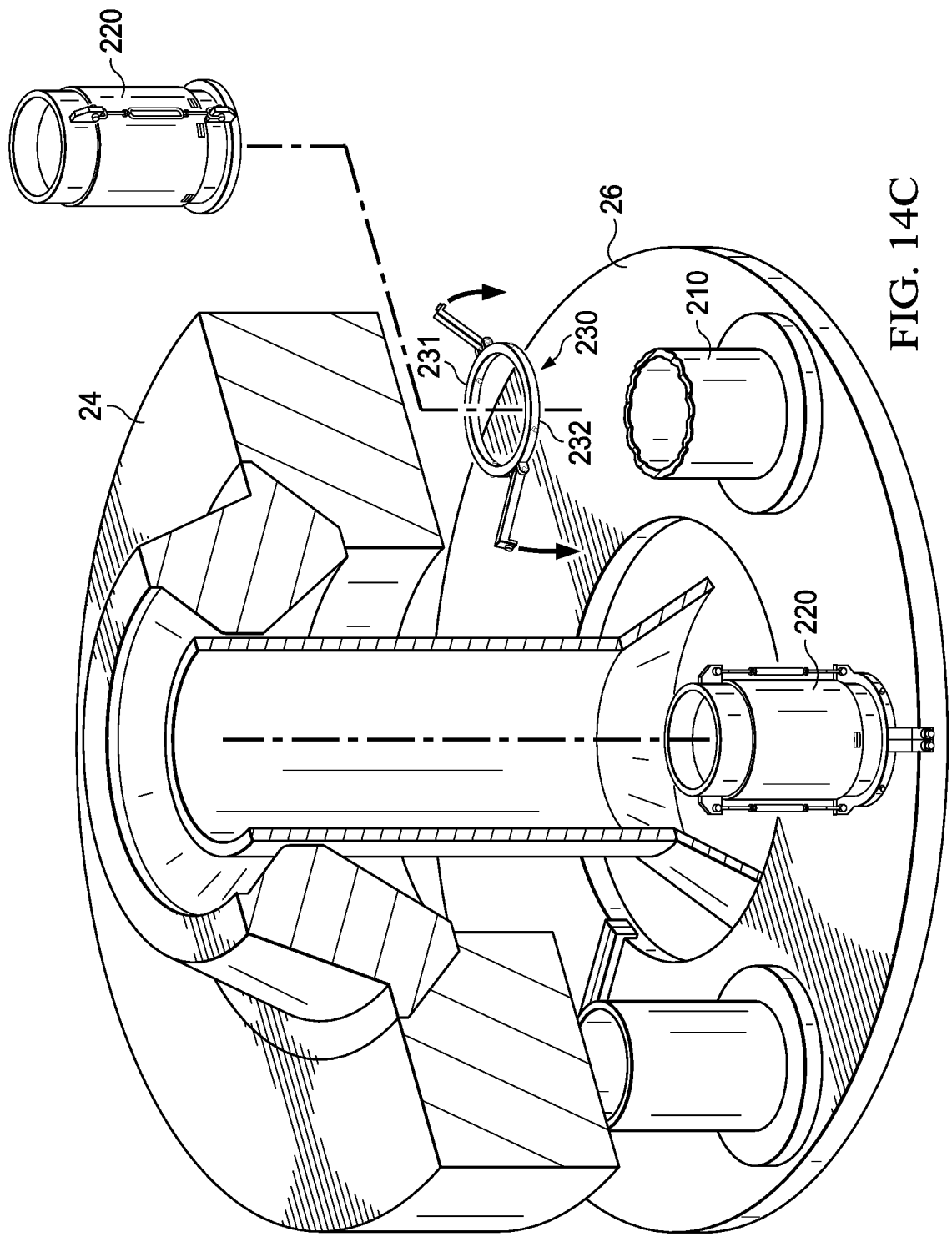
FIG. 14C is a perspective view of a partial installation of variable reluctance measurement technology field cells in a top connector assembly using an embodiment of a radial-locating device.

In such circumstances, modular variable reluctance measurement technology sensors may be installed in the spaces between the existing conventional load cells to continue to provide the ability to monitor the tension in a tendon line while avoiding the time and expense that would be associated with replacing or removing unreliable or failed conventional load cell assemblies. Referring to FIGS. 14A-C, VRMT field cells 220 may be installed in the field to convert or retrofit an existing porch-mounted tendon tension monitoring system. The VRMT field cells 220 may be installed between the upper load plate 24 and lower load plate 26 of a tendon top connector assembly 200. As is typical for the load cells 210, three VRMT field cells 220 are preferably deployed around the central axis of the tendon at 120 degree intervals, although more or fewer VRMT field cells may be used and preferably equiangularly displaced relative to each other.

The VRMT field cells 220 are also preferably positioned such that they are radially equidistant from the central axis of the tendon. Another possible embodiment would involve the placement of sensors around more than one known radius. Because they are installed in the field (i.e., underwater), a radial positioning device such as a location ring 230 may be used to position each VRMT field cell 220 at an equal distance from the central axis of the tendon. The location ring 230 shown in FIG. 14A includes two arms 231 and 232 that may be positioned around the lower load plate 26 and secured to the lower load plate 26 via end screws. The arms 231 and 232 may also be secured together. The two semi-circular indents of the arms 231 and 232 form a seat that engages and locates the VRMT field cell 220 at a particular radial distance from the central axis of the tendon 18.

Referring to FIG. 14B, in an embodiment, rather than arms 231 and 232 that come together as shown in FIG. 14A to surround the base of field cell 220, the radial positioning device 230 may comprise arms that come together such that one arm engages the base of field cell 220 on the side closest to the central axis of the tendon while the other arm engages field cell 200 on the opposite side which is farthest away from the central axis of the tendon.

In another embodiment, the radial positioning device could comprise arms that are integrally formed with VRMT field cell 220. In such an embodiment, there are many ways that the integral arms could secure VRMT field cell to upper load plate 24 and/or lower load plate 26. For example, referring to FIG. 14C, the radial positioning device may comprise hinged arms that rotate relative to field cell 220 such that, once field cell 220 is in the desired position, the hinged arms are rotated to engage lower load plate 26 and/or upper load plate 24. Alternatively, the arms may be radially extensible such that, once field cell 220 is in position, the arms are extended to the edge of lower load plate 26 and/or upper load plate 24. In either such embodiment, the hinged arms or extensible arms may also comprise an end portion that may be pivoted or rotated around the edge of the lower load plate 26 or upper load plate 24 to secure the radial positioning device to the load plate.

Figure 15A:
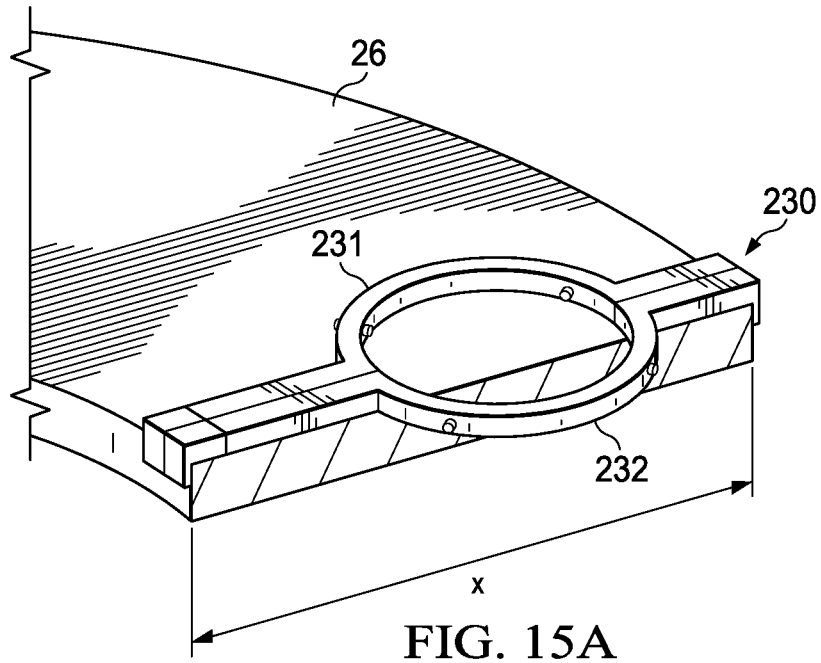
FIG. 15A is a view of an embodiment of a radial locating device with telescoping arms in a first position.
Figure 15B:
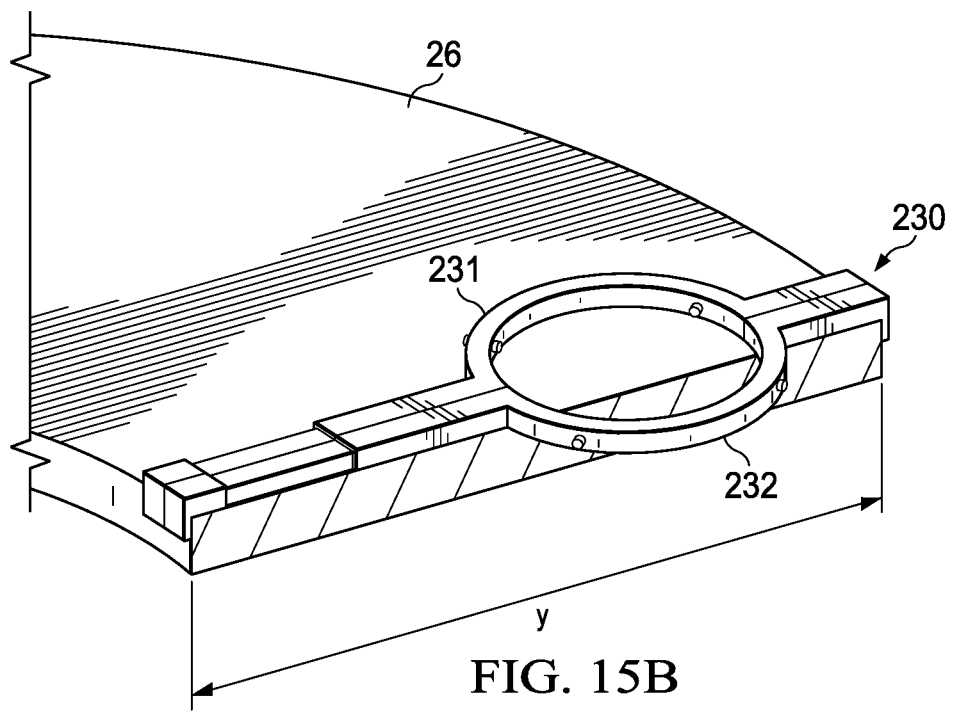
FIG. 15B is a view of an embodiment of a radial locating device with telescoping arms in a second position.
Figure 17A:
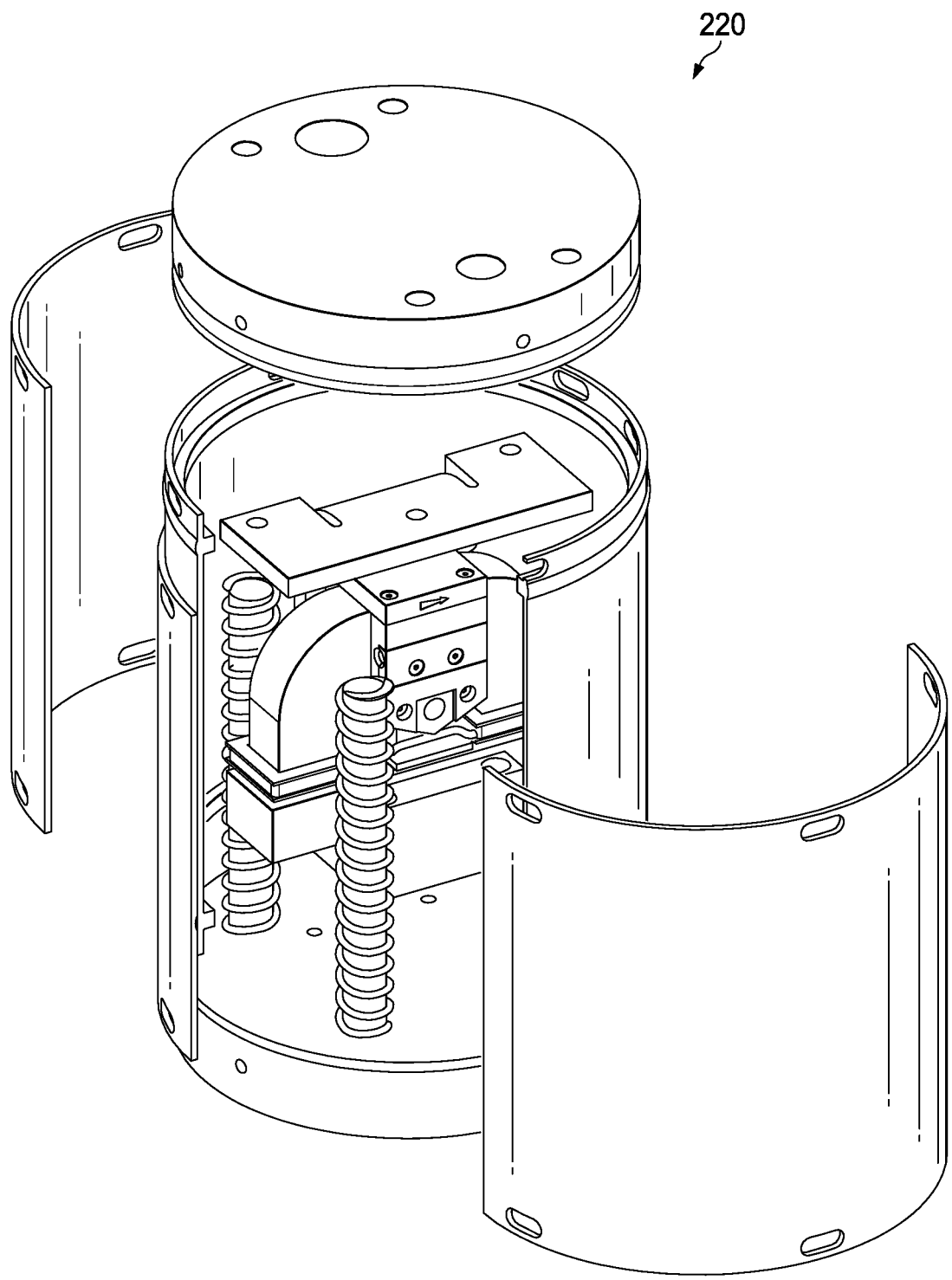
FIG. 17A is a perspective view of an embodiment of a variable reluctance measurement technology field cell.
Figure 17B:
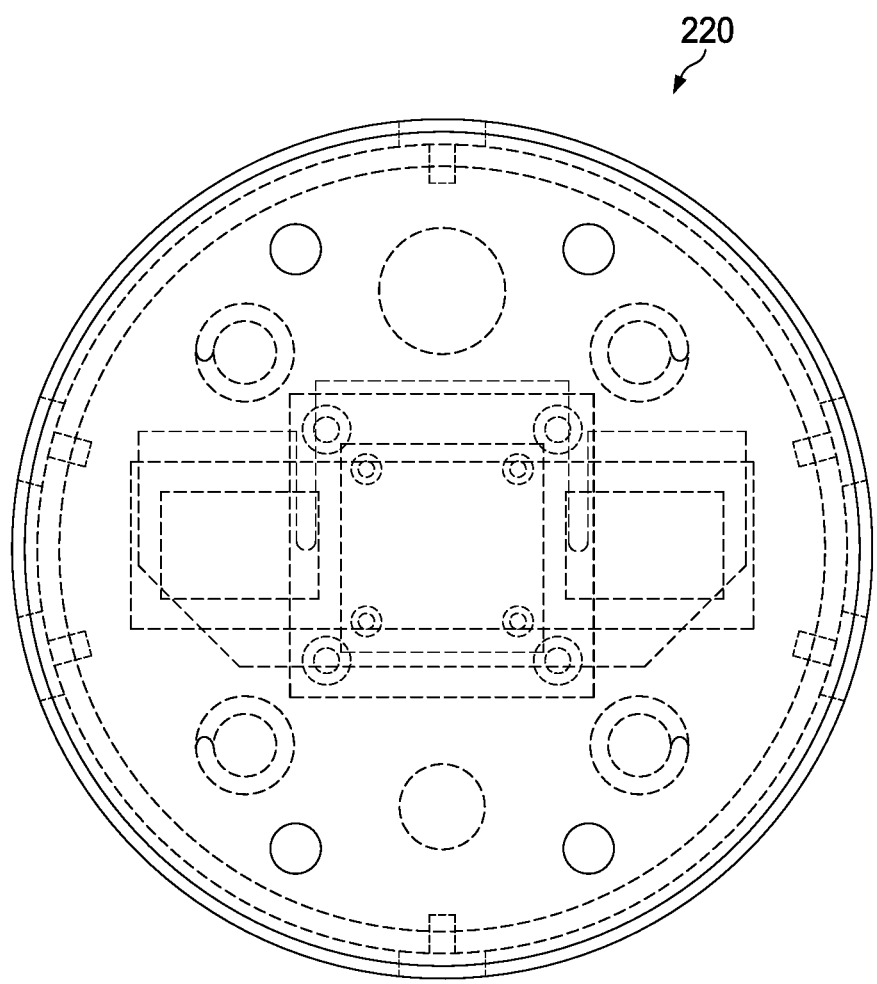
FIG. 17B is a top-down view of an embodiment of the variable reluctance measurement technology field cell of FIG. 17A.
Figure 17C:
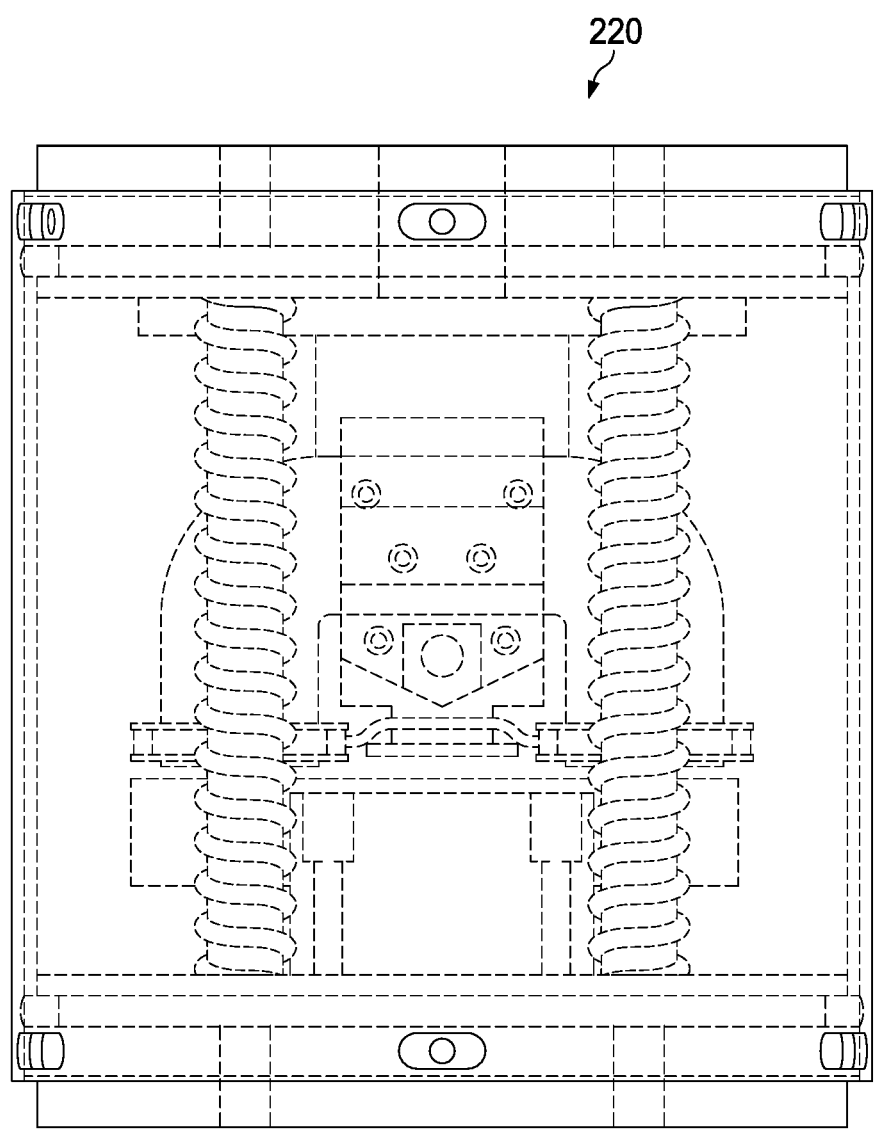
FIG. 17C is a cutaway view of an embodiment of a variable reluctance measurement technology field cell of FIG. 17A.
Figure 17D:
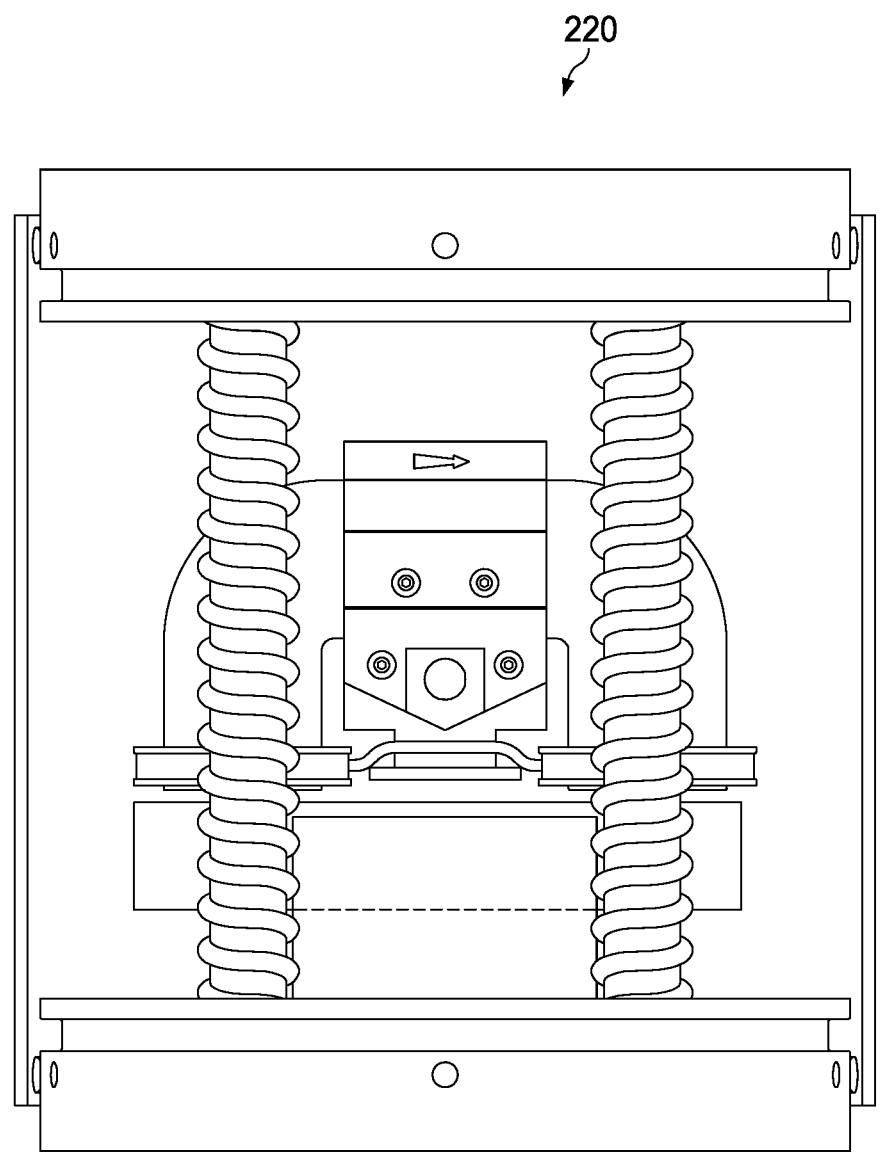
FIG. 17D is a side view of an embodiment of a variable reluctance measurement technology field cell of FIG. 17A.
Figure 18A:
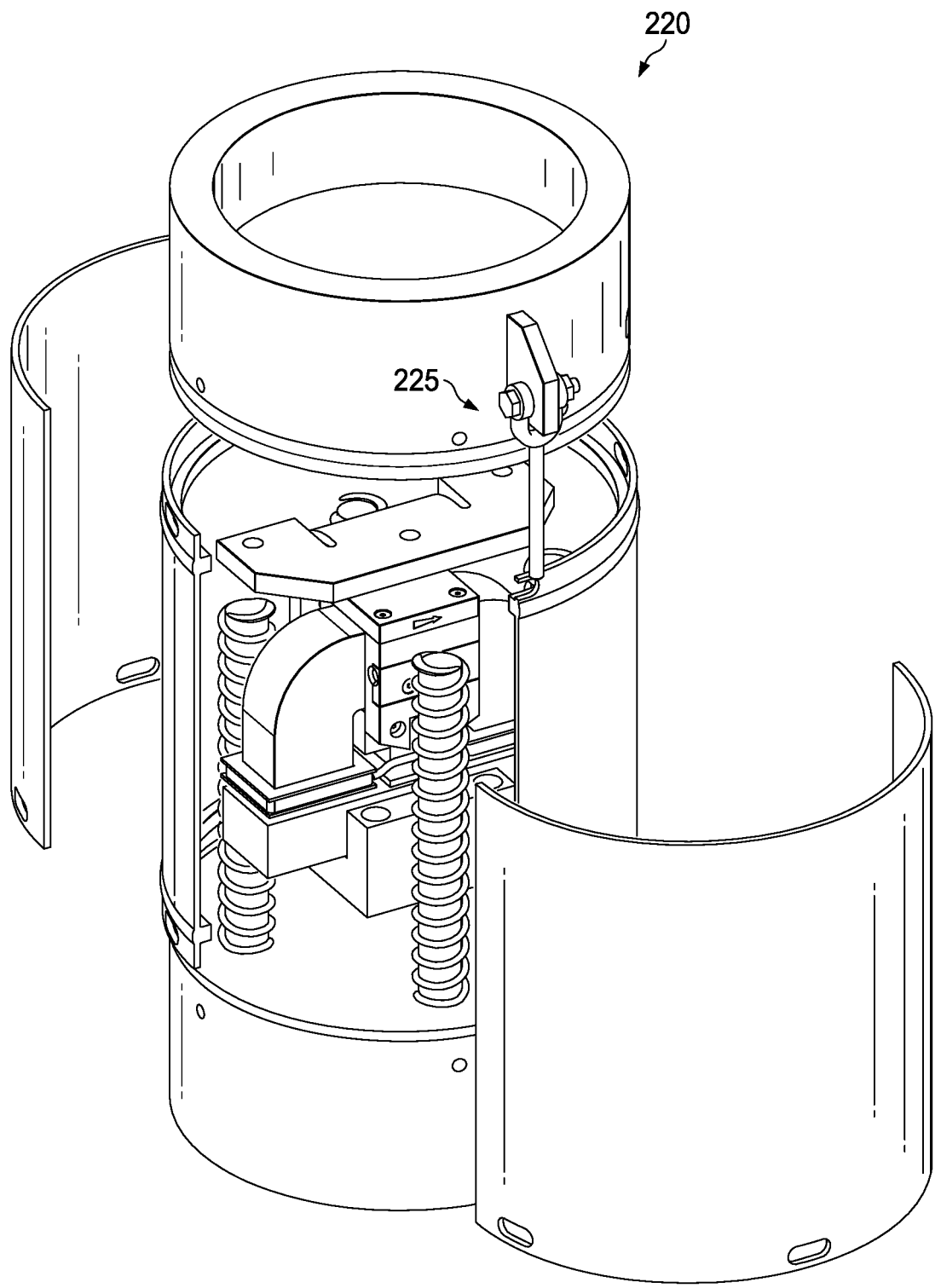
FIG. 18A is a perspective view of an embodiment of a variable reluctance measurement technology field cell with turnbuckles.
Figure 18B:
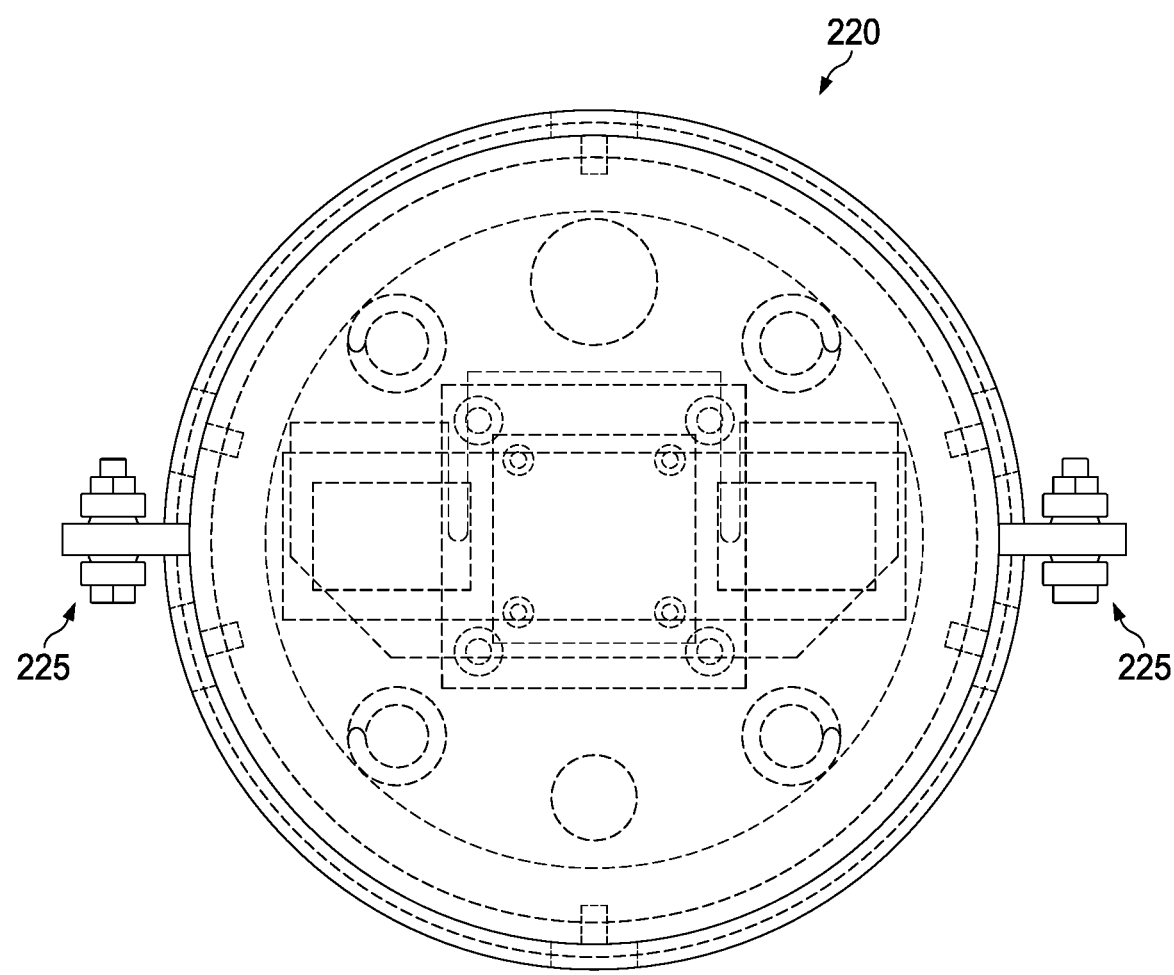
FIG. 18B is a top-down view of an embodiment of the variable reluctance measurement technology field cell with turnbuckles of FIG. 18A.
Figure 18C:
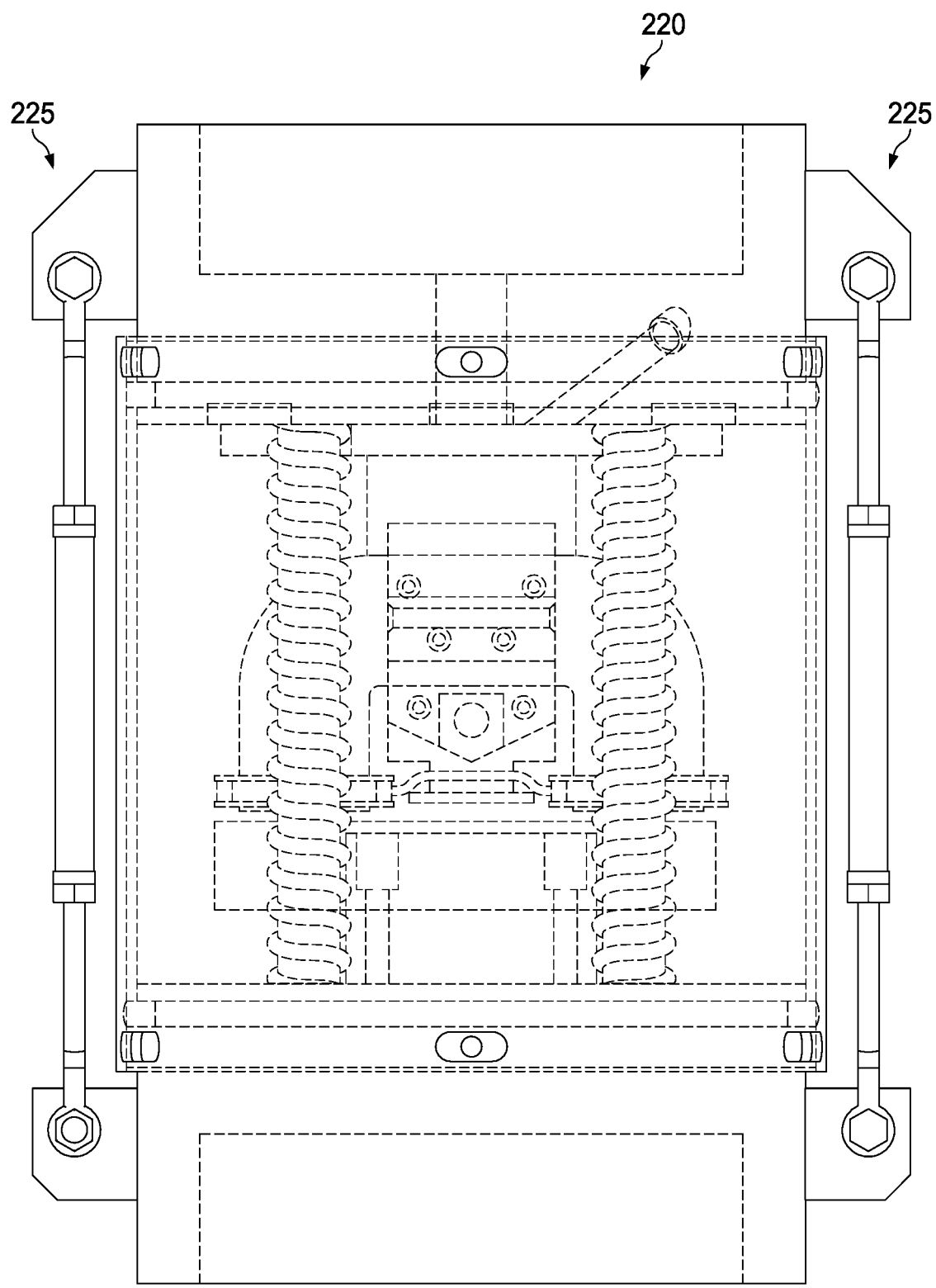
FIG. 18C is a cutaway view of an embodiment of a variable reluctance measurement technology field cell with turnbuckles of FIG. 18A.
Figure 18D:
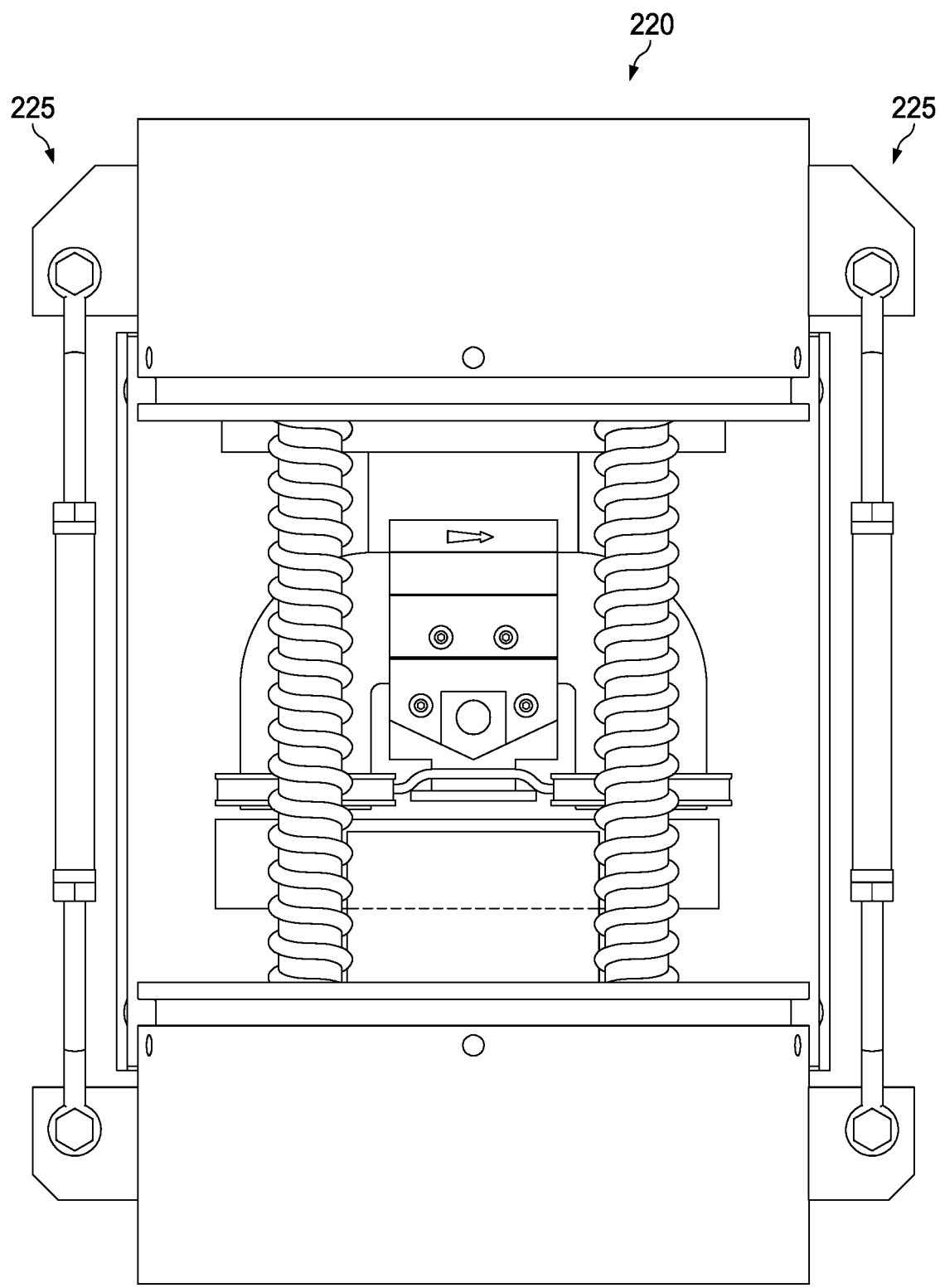
FIG. 18D is a side view of an embodiment of a variable reluctance measurement technology field cell with turnbuckles of FIG. 18A.

In each of the above described embodiments, the radial positioning device may be extensible to adapt to different flange widths on the lower load plate 26 and/or upper load plate 24, as shown in FIGS. 15A and 15B.

In another embodiment, the radial positioning device may comprise arms formed of spring steel or another comparable material, with radially extending portions that engage the surface of lower load plate 26 and/or upper load plate 24 and an end portion configured to hook over the edge of the load plate, as shown in FIG. 16. Such an embodiment may be formed integrally with VRMT load cell 220 or a separate component that engages the base of VRMT load cell 220.

In each of the above described embodiments, the radial positioning device may be secured to the upper load plate 24, or a radial positioning device may be used for each of the load plates.

The radial positioning devices described above may also function to retain the VRMT field cell 220 in position when exposed to environmental forces such as ocean currents.

Referring now to FIGS. 17A-D and 18A-D, two embodiments of a VRMT field cell 220 are shown. As the gap between the upper load plate 24 and lower load plate 26 may vary from a top connector assembly on one platform to another, the VRMT field cell 220 may be equipped to be axially extensible to adapt to varying gap sizes. Additionally, because top connector assemblies used with floating platforms are underwater, they are exposed to sea currents. Although the VRMT field cells 220 are not load bearing when deployed, they should be capable of withstanding shear forces from such currents and should be installed accordingly.

The VRMT field cell 220 may include internal springs and an external turnbuckle arrangement 225, as shown in FIGS. 18A-D. A turnbuckle 225 may be adapted to engage one or more of the springs to axially expand or contract the VRMT field cell 220. In this way, the springs and turnbuckles 225 may be used in concert for axial adjustment and engagement and to apply the proper axial loading to maintain the VRMT field cell's stability in the load path. A field cell, as described, with a displacement sensor, or sensors, and compression spring assembly, and flexible outer wall, can be assembled, tested, and employed as a pre-calibrated unit, which will provide quantitative displacement feedback based on installed compressive load, and vice versa (i.e., compressive load feedback based on installed displacement).

In another embodiment, the VRMT field cell 220 may include a threaded base at one or both ends of the cylinder that may be engaged to expand or contract the axial length of the field cell 220.

In another embodiment, shims of appropriate thickness made of metal or another suitable material may be wedged between a field cell 220 and load plate to secure the field cell 220 between the mounting flanges.

In another embodiment, the field cell 220 may incorporate a telescoping member for axial adjustment to engage with the mounting flanges.

A field installer, such as a diver, may deploy the VRMT field cells 220 in an existing top connector assembly. A method of installing the VRMT field cells 220 may include: determining a number of VRMT field cells to be installed in a top connector assembly, placing and securing a location ring for each of the field cells such that field cells are preferably substantially equiangular relative to each other around a lower load plate, placing a VRMT field cell in each of the location rings, engaging a radial positioning device for each of the VRMT field cells 220, adjusting the axial length of each field cell to engage the upper load plate and the lower load plate and secure the field cell in the top connector assembly. Note that the axial adjustment of the field cell and the engagement of the location ring to the lower load plate should be designed such that they may be installed in the field. Note that while the field cells are preferably placed at equal angles to each other and equidistant to the central axis of the tendon, some variability is expected due to the manual install, and such variability may be compensated for in processing.

Once proper loading has been applied, in operation, each VRMT field cell 220 will cycle in tension and compression around the pre-load, and the VRMT proximity sensor in each field cell 220 will register changes in inductance based on the deflection of the load plates relative to each other. The deflections can then be modeled in a computing system as described above to monitor the tension of the tendon. Because multiple field cells are preferably installed, the deflection may be calculated at multiple points and a three dimensional model of the tendon tension may be developed. Further, because the field cells are substantially equidistant from the central axis of the tendon, the bending moment of the tendon may be calculated and modeled. In circumstances where the field cells are not substantially equidistant from the central axis of the tendon, or where the field cells are not equiangularly displaced relative to each other, or both, the system may be calibrated to be able to compensate for the irregularities in positioning. Accordingly, the bending moment of the system may still be calculated.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above embodiment descriptions.

The invention claimed is:

1. A porch mounted tendon tension monitoring apparatus comprising:
   a plurality of variable reluctance measurement technology sensors configured to be positioned between a pair of mounting flanges with a central longitudinal axis, wherein each of the plurality of variable reluctance measurement technology sensors are configured to measure a displacement between the pair of mounting flanges; and
   one or more radial positioning devices configured to adjust a radial distance from one or more of the variable reluctance measurement technology sensors to the central longitudinal axis.

2. The porch mounted tendon tension monitoring apparatus of claim 1, wherein each of the plurality of variable reluctance measurement technology sensors is mounted in a mechanical strain amplifier.

3. The porch mounted tendon tension monitoring apparatus of claim 1, wherein each of the plurality of variable reluctance measurement technology sensors is mounted in a field cell between the mounting flanges.

4. The porch mounted tendon tension monitoring apparatus of claim 1, wherein each of the plurality of variable reluctance measurement technology sensors is substantially equiangularly displaced from adjacent variable reluctance measurement technology sensors.

5. The porch mounted tendon tension monitoring apparatus of claim 1, wherein each of the plurality of variable reluctance measurement technology sensors is substantially equidistant from a central axis of the mounting flanges.

6. The porch mounted tendon tension monitoring apparatus of claim 1, further comprising an outer cylindrical boot, the outer cylindrical boot surrounding the plurality of variable reluctance measurement technology sensors.

7. The porch mounted tendon tension monitoring apparatus of claim 6, wherein the outer cylindrical boot forms a void area filled with a non-conductive fluid.

8. The porch mounted tendon tension monitoring apparatus of claim 1, further comprising a computing system that is communicatively coupled to each of the plurality of variable reluctance measurement technology sensors, the plurality of variable reluctance measurement technology sensors transmitting data to the computing system.

9. The porch mounted tendon tension monitoring apparatus of claim 8, wherein the computing system is wirelessly communicatively coupled to each of the plurality of variable reluctance measurement technology sensors.

10. The porch mounted tendon tension monitoring apparatus of claim 1, wherein each of the plurality of variable reluctance measurement technology sensors further comprises:
    one or more compression spring assemblies; and
    a turnbuckle assembly adapted to engage the compression spring and axially expand or contract the compression spring.

11. A field cell employing variable reluctance measurement technology for monitoring tendon tension, the field cell comprising:
    two rigid endplates;
    an outer wall;
    a displacement sensor disposed between the two rigid endplates and within the outer wall, wherein the displacement sensor measures a displacement between the two rigid endplates;
    one or more compression spring assemblies disposed between the two rigid endplates and within the outer wall; and
    a turnbuckle assembly disposed outside the outer wall, the turnbuckle assembly adapted to engage the compression spring and axially expand or contract the compression spring to alter the distance between the two rigid endplates.

12. The field cell of claim 11, wherein the outer wall of the field cell is adapted to telescope.

13. The field cell of claim 11, further comprising a radial positioning device.

14. A method of retrofitting a tension leg platform with variable reluctance measurement technology for tendon tension monitoring, comprising:
    installing one or more field cells comprising variable reluctance measurement technology sensors between a pair of mounting flanges attached to a tendon connected to a platform, each of the field cells configured to measure a displacement between the pair of mounting flanges; and positioning the one or more field cells using a radial positioning device.

15. The method of retrofitting a tension leg platform with variable reluctance measurement technology for tendon tension monitoring of claim 14, wherein each of the one or more field cells are substantially equidistant from a central axis of the tendon.

16. The method of retrofitting a tension leg platform with variable reluctance measurement technology for tendon tension monitoring of claim 14, further comprising removing existing field cells before installing the one or more field cells.

17. The method of retrofitting a tension leg platform with variable reluctance measurement technology for tendon tension monitoring of claim 14, wherein the one or more field cells are substantially equiangularly displaced from each other.

18. The method of retrofitting a tension leg platform with variable reluctance measurement technology for tendon tension monitoring of claim 14, wherein the field cell further comprises a compression spring assembly and a turnbuckle assembly adapted to engage the compression spring, and the method further comprises using the turnbuckle assembly to axially expand the compression spring.

19. The method of retrofitting a tension leg platform with variable reluctance measurement technology for tendon tension monitoring of claim 14, further comprising:
  providing an outer cylindrical boot surrounding the one or more field cells; and
  filling a void area within the outer cylindrical boot with a non-conductive fluid.

20. The method of retrofitting a tension leg platform with variable reluctance measurement technology for tendon tension monitoring of claim 14, further comprising transmitting to a computing system information from each of the one or more variable reluctance measurement technology sensors.

21. The method of retrofitting a tension leg platform with variable reluctance measurement technology for tendon tension monitoring of claim 20, wherein the computing system is wirelessly communicatively coupled to each of the one or more variable reluctance measurement technology sensors.

* * * * *